US012696102B2

(12) United States Patent
Esswie

(10) Patent No.: US 12,696,102 B2
(45) Date of Patent: Jul. 28, 2026

(54) NON-TERRESTRIAL PROGRESSIVE PAGING

(71) Applicant: Dell Products, L.P., Round Rock, TX (US)

(72) Inventor: Ali Esswie, Calgary (CA)

(73) Assignee: Dell Products L.P., Round Rock, TX (US)

( * ) Notice: Subject to any disclaimer, the term of this patent is extended or adjusted under 35 U.S.C. 154(b) by 213 days.

(21) Appl. No.: 18/490,547

(22) Filed: Oct. 19, 2023

(65) Prior Publication Data

US 2025/0133417 A1 Apr. 24, 2025

(51) Int. Cl.
H04W 16/28 (2009.01)
H04W 68/02 (2009.01)

(52) U.S. Cl.
CPC ........... H04W 16/28 (2013.01); H04W 68/02 (2013.01)

(58) Field of Classification Search
None
See application file for complete search history.

(56) References Cited

U.S. PATENT DOCUMENTS

2017/0331670 A1* 11/2017 Parkvall ............ H04W 52/0229
2021/0337397 A1* 10/2021 Nilsson ............... H04W 52/367
2024/0064854 A1* 2/2024 Hasanzadezonuzy .....................
H04W 52/0248

FOREIGN PATENT DOCUMENTS

EP 4 195 771 6/2023
GB 2566316 3/2019

OTHER PUBLICATIONS

International Search Report and Written Opinion for PCT Application No. PCT/US2024/013881 mailed Aug. 8, 2024, 14 pages.
Notification Concerning Transmittal of Copy of International Preliminary Report on Patentability for PCT Application No. PCT/US2024/013881 mailed Apr. 30, 2026, 9 pages.
European Office Action mailed May 27, 2026 for European Patent Application No. 24710968.9, 3 pages.

* cited by examiner

*Primary Examiner* — Walter J Divito
(74) *Attorney, Agent, or Firm* — Amin, Turocy & Watson, LLP

(57) ABSTRACT

A radio network node may receive from a core network a beam pattern configuration and a progressive paging configuration comprising one or more paging subpattern indications. The node may calculate beams of the subpatterns based on information in the beam pattern configuration. The node may transmit a paging message according to indicated subpatterns according to an order in the progressive paging configuration. The progressive paging configuration may comprise one or more wait periods corresponding to the one or more subpattern indications. The node may wait during a wait period associated with a subpattern after transmitting the paging message according to the subpattern. If a response is not received, the node may transmit the paging message according to a next-in-order subpattern. If a response to the paging message transmitted during a subpattern is received by the node, paging may be stopped and a connection with the user equipment may be established.

20 Claims, 12 Drawing Sheets

Paging sub-pattern $x_1$ (NULL)

Paging sub-pattern $x_i$ (average each two beams)

200

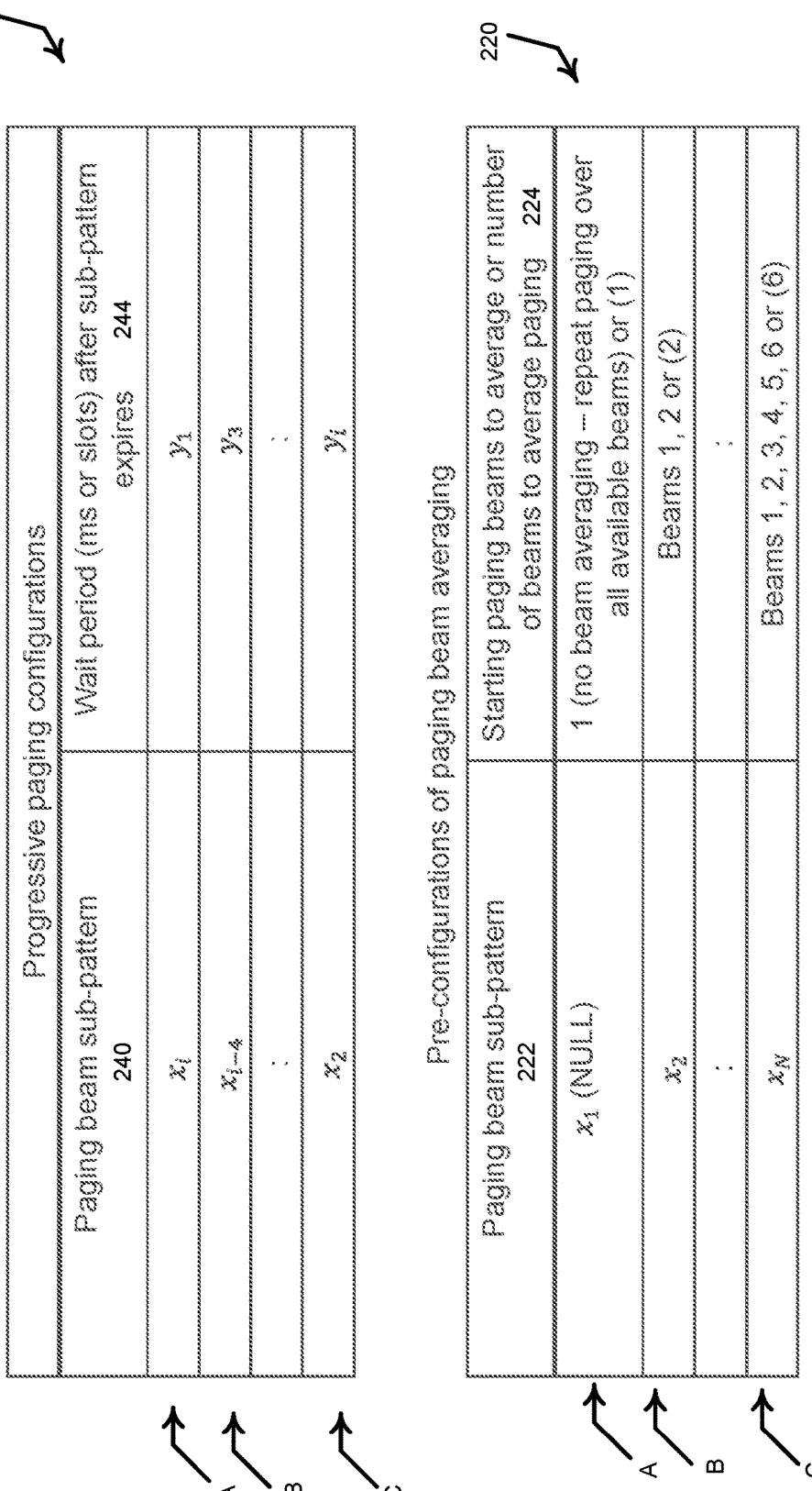

Progressive paging configurations

| Paging beam sub-pattern 240 | Wait period (ms or slots) after sub-pattern expires 244 |
|---|---|
| $x_i$ | $y_1$ |
| $x_{i-4}$ | $y_3$ |
| : | : |
| $x_2$ | $y_i$ |

Pre-configurations of paging beam averaging

| Paging beam sub-pattern 222 | Starting paging beams to average or number of beams to average paging 224 |
|---|---|
| $x_1$ (NULL) | 1 (no beam averaging – repeat paging over all available beams) or (1) |
| $x_2$ | Beams 1, 2 or (2) |
| : | : |
| $x_N$ | Beams 1, 2, 3, 4, 5, 6 or (6) |

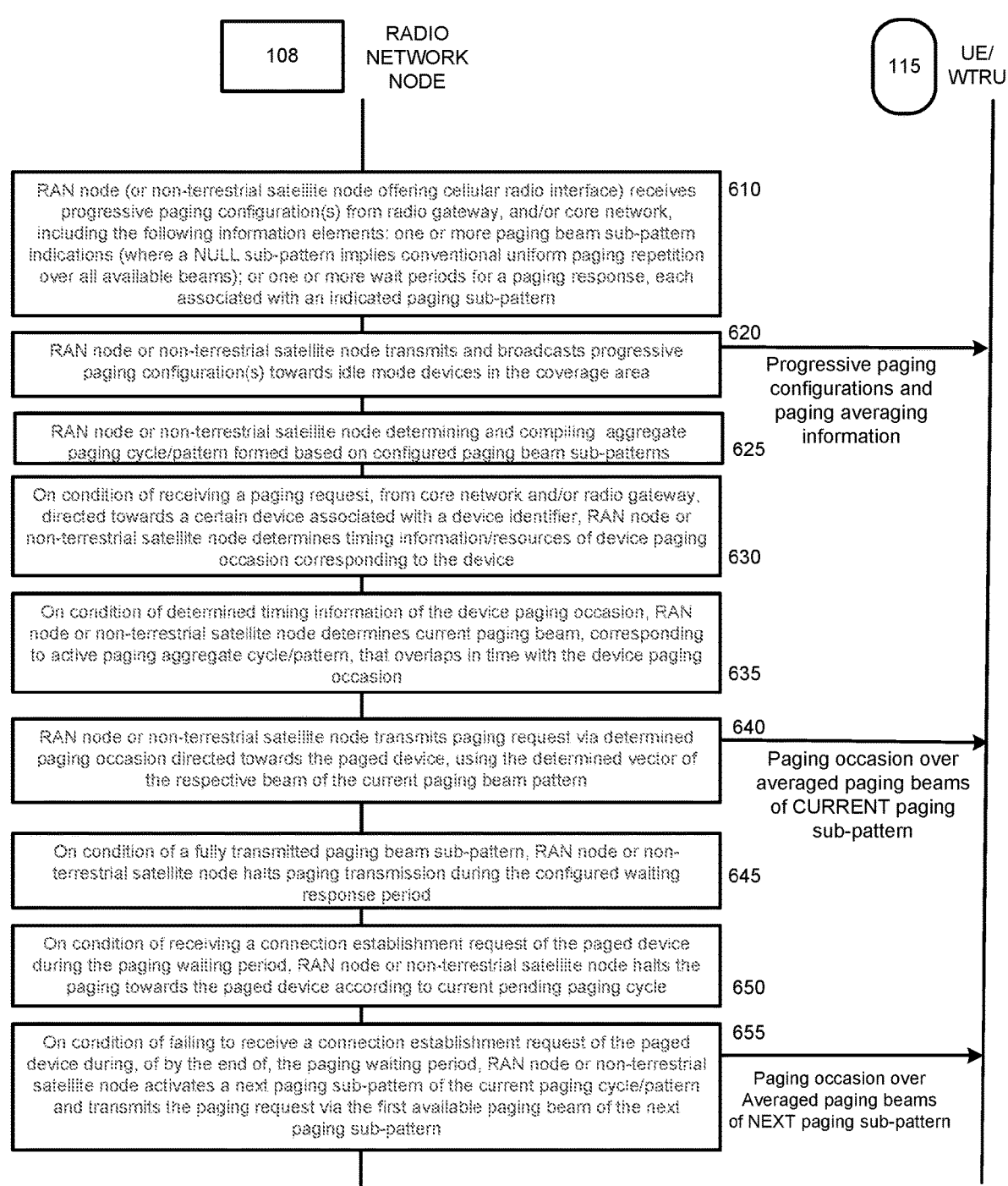

RADIO NETWORK NODE

108

115   UE/ WTRU

RAN node (or non-terrestrial satellite node offering cellular radio interface) receives progressive paging configuration(s) from radio gateway, and/or core network, including the following information elements: one or more paging beam sub-pattern indications (where a NULL sub-pattern implies conventional uniform paging repetition over all available beams); or one or more wait periods for a paging response, each associated with an indicated paging sub-pattern   610

RAN node or non-terrestrial satellite node transmits and broadcasts progressive paging configuration(s) towards idle mode devices in the coverage area   620

RAN node or non-terrestrial satellite node determining and compiling aggregate paging cycle/pattern formed based on configured paging beam sub-patterns   625

On condition of receiving a paging request, from core network and/or radio gateway, directed towards a certain device associated with a device identifier, RAN node or non-terrestrial satellite node determines timing information/resources of device paging occasion corresponding to the device   630

On condition of determined timing information of the device paging occasion, RAN node or non-terrestrial satellite node determines current paging beam, corresponding to active paging aggregate cycle/pattern, that overlaps in time with the device paging occasion   635

RAN node or non-terrestrial satellite node transmits paging request via determined paging occasion directed towards the paged device, using the determined vector of the respective beam of the current paging beam pattern   640

On condition of a fully transmitted paging beam sub-pattern, RAN node or non-terrestrial satellite node halts paging transmission during the configured waiting response period   645

On condition of receiving a connection establishment request of the paged device during the paging waiting period, RAN node or non-terrestrial satellite node halts the paging towards the paged device according to current pending paging cycle   650

On condition of failing to receive a connection establishment request of the paged device during, of by the end of, the paging waiting period, RAN node or non-terrestrial satellite node activates a next paging sub-pattern of the current paging cycle/pattern and transmits the paging request via the first available paging beam of the next paging sub-pattern   655

Progressive paging configurations and paging averaging information

Paging occasion over averaged paging beams of CURRENT paging sub-pattern

Paging occasion over Averaged paging beams of NEXT paging sub-pattern

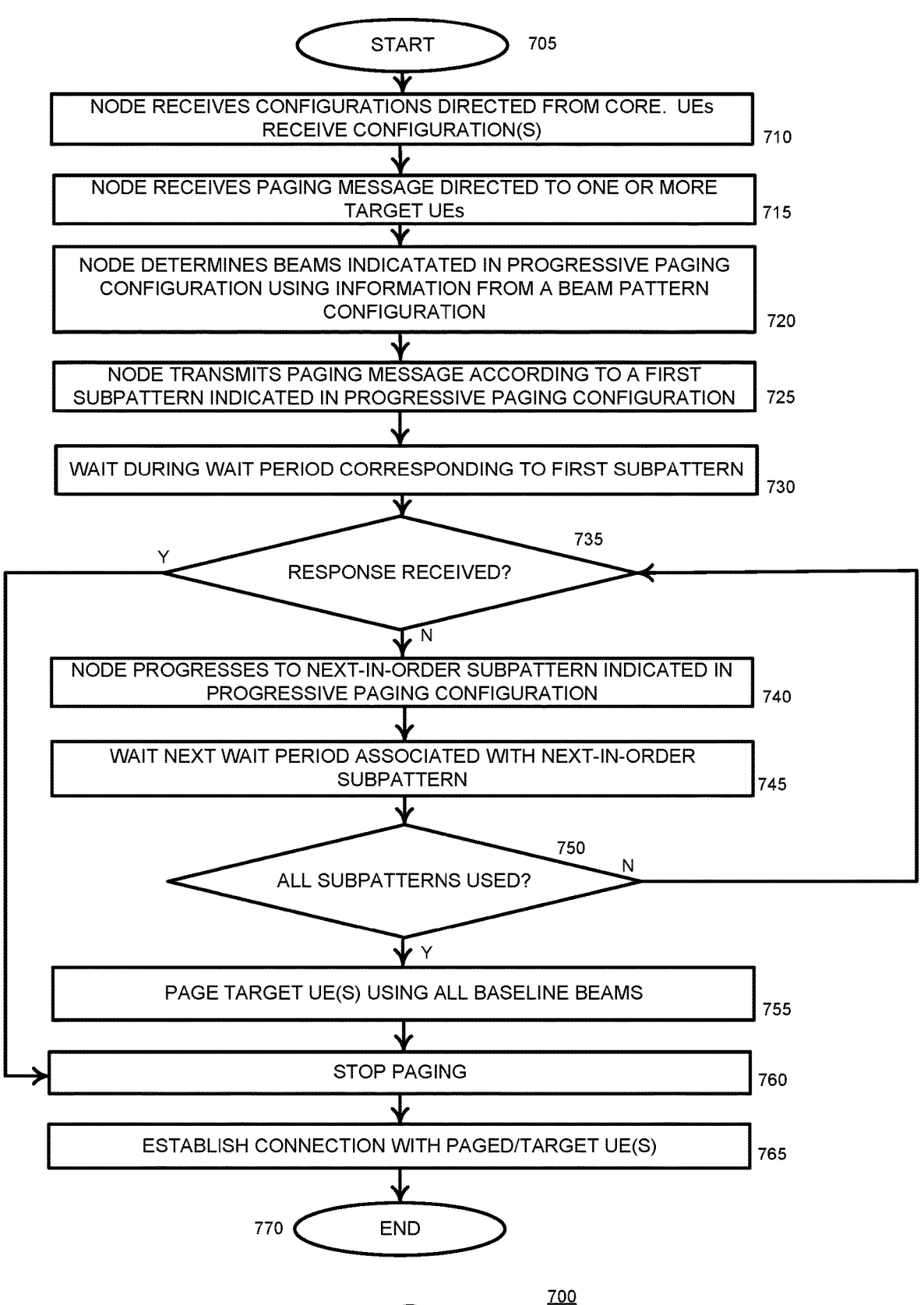
FIG. 7    700

Figure 8:
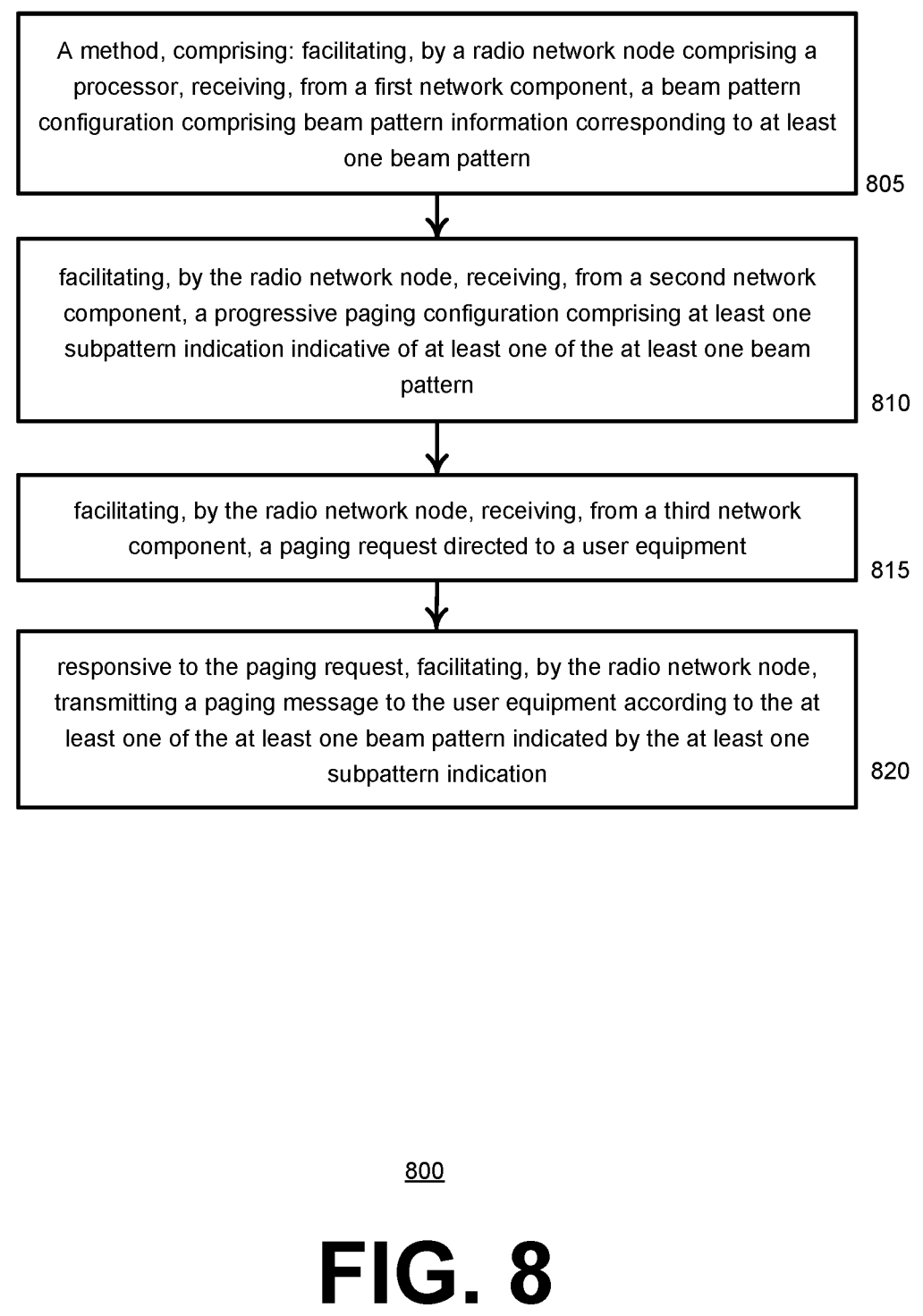

A method, comprising: facilitating, by a radio network node comprising a processor, receiving, from a first network component, a beam pattern configuration comprising beam pattern information corresponding to at least one beam pattern

805 facilitating, by the radio network node, receiving, from a second network component, a progressive paging configuration comprising at least one subpattern indication indicative of at least one of the at least one beam pattern

810 facilitating, by the radio network node, receiving, from a third network component, a paging request directed to a user equipment

815 responsive to the paging request, facilitating, by the radio network node, transmitting a paging message to the user equipment according to the at least one of the at least one beam pattern indicated by the at least one subpattern indication

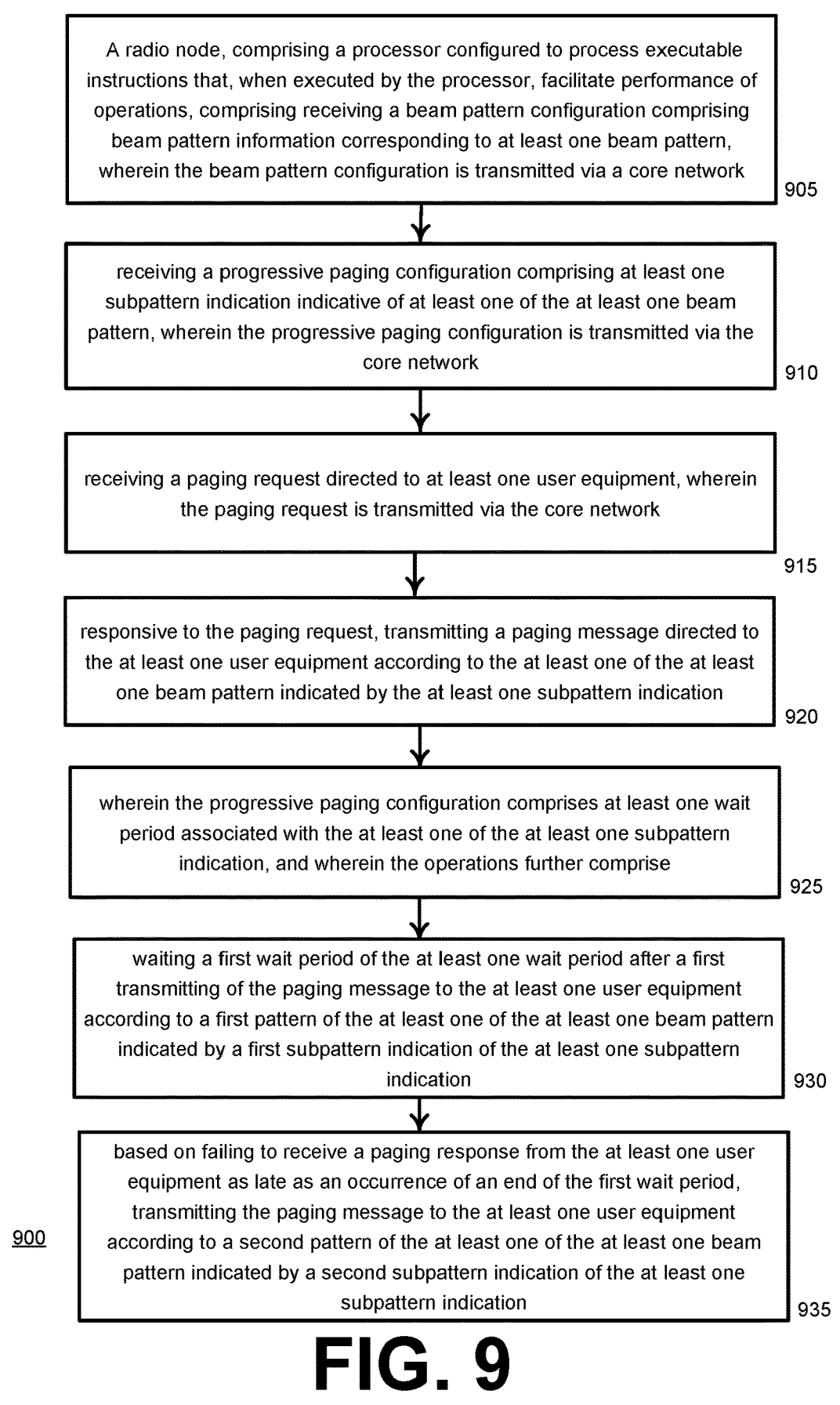

A radio node, comprising a processor configured to process executable instructions that, when executed by the processor, facilitate performance of operations, comprising receiving a beam pattern configuration comprising beam pattern information corresponding to at least one beam pattern, wherein the beam pattern configuration is transmitted via a core network
905 receiving a progressive paging configuration comprising at least one subpattern indication indicative of at least one of the at least one beam pattern, wherein the progressive paging configuration is transmitted via the core network
910 receiving a paging request directed to at least one user equipment, wherein the paging request is transmitted via the core network
915 responsive to the paging request, transmitting a paging message directed to the at least one user equipment according to the at least one of the at least one beam pattern indicated by the at least one subpattern indication
920 wherein the progressive paging configuration comprises at least one wait period associated with the at least one of the at least one subpattern indication, and wherein the operations further comprise
925 waiting a first wait period of the at least one wait period after a first transmitting of the paging message to the at least one user equipment according to a first pattern of the at least one of the at least one beam pattern indicated by a first subpattern indication of the at least one subpattern indication
930

900 based on failing to receive a paging response from the at least one user equipment as late as an occurrence of an end of the first wait period, transmitting the paging message to the at least one user equipment according to a second pattern of the at least one of the at least one beam pattern indicated by a second subpattern indication of the at least one subpattern indication
935

FIG. 9

Figure 10:
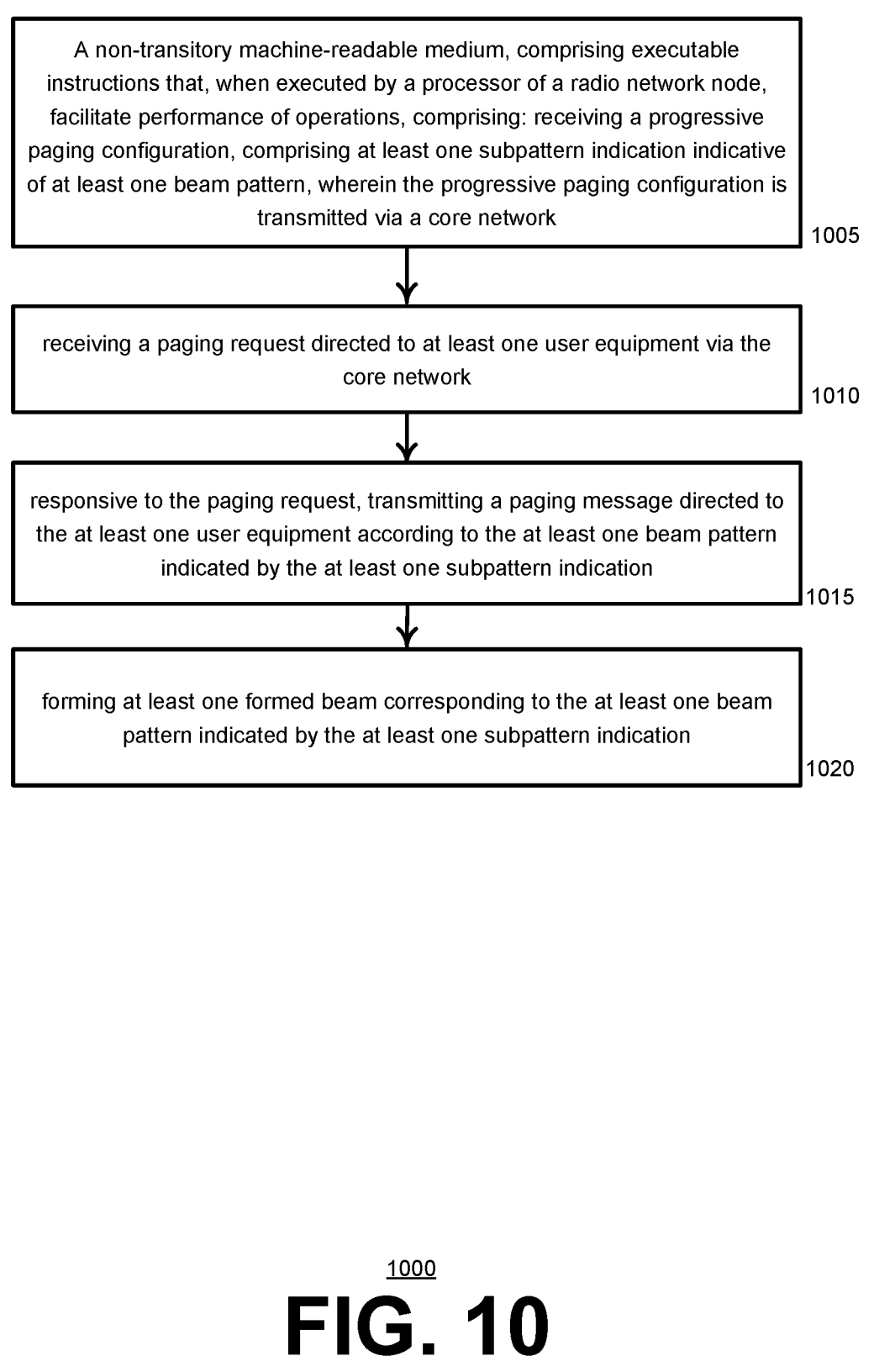

A non-transitory machine-readable medium, comprising executable instructions that, when executed by a processor of a radio network node, facilitate performance of operations, comprising: receiving a progressive paging configuration, comprising at least one subpattern indication indicative of at least one beam pattern, wherein the progressive paging configuration is transmitted via a core network

1005

↓ receiving a paging request directed to at least one user equipment via the core network

1010

↓ responsive to the paging request, transmitting a paging message directed to the at least one user equipment according to the at least one beam pattern indicated by the at least one subpattern indication

1015

↓ forming at least one formed beam corresponding to the at least one beam pattern indicated by the at least one subpattern indication

NON-TERRESTRIAL PROGRESSIVE PAGING

BACKGROUND

The 'New Radio' (NR) terminology that is associated with fifth generation mobile wireless communication systems ("5G") refers to technical aspects used in wireless radio access networks ("RAN") that comprise several quality of service classes ("QoS"), including ultrareliable and low latency communications ("URLLC"), enhanced mobile broadband ("eMBB"), and massive machine type communication ("mMTC"). The URLLC QoS class is associated with a stringent latency requirement (e.g., low latency or low signal/message delay) and a high reliability of radio performance, while conventional eMBB use cases may be associated with high-capacity wireless communications, which may permit less stringent latency requirements (e.g., higher latency than URLLC) and less reliable radio performance as compared to URLLC. Performance requirements for mMTC may be lower than for eMBB use cases. Some use case applications involving mobile devices or mobile user equipment such as smart phones, wireless tablets, smart watches, and the like, may impose on a given RAN resource loads, or demands, that vary. A RAN node may activate a network energy saving mode to reduce power consumption.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an example embodiment, a method may comprise facilitating, by a radio network node comprising a processor, receiving, from a first network component, a beam pattern configuration comprising beam pattern information corresponding to at least one beam pattern; facilitating, by the radio network node, receiving, from a second network component, a progressive paging configuration comprising at least one subpattern indication indicative of at least one of the at least one beam pattern; and facilitating, by the radio network node, receiving, from a third network component, a paging request directed to a user equipment. The method may further comprise, responsive to the paging request, facilitating, by the radio network node, transmitting a paging message to the user equipment according to the at least one of the at least one beam pattern indicated by the at least one subpattern indication.

In an embodiment, the radio network node may be configured with a baseline beam configuration comprising baseline beam information corresponding to a baseline beam pattern comprising at least one baseline beam. The baseline beam pattern may be different than the at least one of the at least one beam pattern indicated by the at least one subpattern indication.

In an embodiment, the facilitating of the transmitting of the paging message may further comprise facilitating forming of at least one formed beam corresponding to the at least one of the at least one beam pattern indicated by the at least one subpattern indication based on a function of at least one baseline beam corresponding to a baseline beam pattern.

The at least one formed beam may be determined based on a beam function applied to the at least one baseline beam. The beam function may comprise a mathematical function. The mathematical function may comprise an average of at least two beam vectors corresponding to at least two of the at least one baseline beam.

In an embodiment, the progressive paging configuration may comprise at least one wait period associated with the at least one subpattern indication. The method may further comprise facilitating, by the radio network node, waiting a wait period of the at least one wait period after a first transmitting of the paging message to the user equipment according to a first pattern of the at least one of the at least one beam pattern indicated by a first subpattern indication of the at least one subpattern indication. Responsive to failing, by the radio network node, to receive a paging response from the user equipment by an occurrence of an end of the wait period, the method may further comprise facilitating, by the radio network node, a second transmitting of the paging message to the user equipment according to a second pattern of the at least one of the at least one beam pattern indicated by a second subpattern indication of the at least one subpattern indication.

In an embodiment, the progressive paging configuration may comprise at least one wait period associated with the at least one of the at least one subpattern indication. The method may further comprise facilitating, by the radio network node, waiting a wait period of the at least one wait period after a first transmitting of the paging message to the user equipment according to a pattern of the at least one of the at least one beam pattern indicated by a subpattern indication of the at least one subpattern indication; facilitating, by the radio network node, receiving, from the user equipment, a paging response by an occurrence of an end of the wait period. The method may further comprise facilitating, by the radio network node, establishing a communication session with the user equipment.

In an embodiment, the method may further comprise facilitating, by the radio network node, transmitting, to the user equipment, the progressive paging configuration, usable by the user equipment to determine monitoring of the at least one of the at least one beam pattern.

In an embodiment, the radio network node may be a radio access network node of a long-range wireless radio access network. In an embodiment, at least one of the first network component, second network component, or third network component may be part of a core network corresponding to the long-range wireless radio access network. In an embodiment, the radio network node may comprise a satellite.

In another example embodiment, a radio node may comprise a processor configured to process executable instructions that, when executed by the processor, facilitate performance of operations, comprising receiving a beam pattern configuration comprising beam pattern information corresponding to at least one beam pattern, wherein the beam pattern configuration is transmitted via a core network; and receiving a progressive paging configuration comprising at least one subpattern indication indicative of at least one of the at least one beam pattern, wherein the progressive paging configuration is transmitted via the core network. The operations may further comprise receiving a paging request directed to at least one user equipment, wherein the paging request is transmitted via the core network. Responsive to the paging request, the operations may further comprise transmitting a paging message directed to the at least one user equipment according to the at least one of the at least one beam pattern indicated by the at least one subpattern indication.

In an embodiment, the progressive paging configuration may comprise at least one wait period associated with the at least one of the at least one subpattern indication. The operations may further comprise waiting a first wait period of the at least one wait period after a first transmitting of the paging message to the at least one user equipment according to a first pattern of the at least one of the at least one beam pattern indicated by a first subpattern indication of the at least one subpattern indication. Based on failing to receive a paging response from the at least one user equipment as late as an occurrence of an end of the first wait period, the operations may further comprise transmitting the paging message to the at least one user equipment according to a second pattern of the at least one of the at least one beam pattern indicated by a second subpattern indication of the at least one subpattern indication.

The first wait period may be associated in the progressive paging configuration with the first subpattern indication of the at least one subpattern indication. A second wait period may be associated with the second subpattern indication of the at least one subpattern indication in the progressive paging configuration. The operations may further comprise waiting the second wait period after transmitting the paging message according to the second pattern of the at least one of the at least one beam pattern; and based on failing to receive a paging response from the at least one user equipment as late as an occurrence of an end of the second wait period, transmitting the paging message to the at least one user equipment according to a third pattern of the at least one of the at least one beam pattern indicated by a third subpattern indication of the at least one subpattern indication. In an embodiment, the first wait period and the second wait period may be different.

The operations may further comprise forming at least one formed beam corresponding to the at least one of the at least one beam pattern indicated by the at least one subpattern indication, and wherein the at least one formed beam is determined based on a beam function applied to an at least one baseline beam.

The operations may further comprise forming a first formed beam, wherein a first pattern of the at least one beam pattern comprises the first formed beam; and forming a second formed beam, wherein a second pattern of the at least one beam pattern comprises the second formed beam. The first formed beam may be different than the second formed beam. The first formed beam and the second formed beam may be different than a baseline beam that corresponds to a baseline beam gain, or signal strength range/distance, and a baseline beam dispersion width. The first formed beam may correspond to a first beam gain that is less than the baseline beam gain and a first beam dispersion width that is greater than the baseline beam dispersion width. The second formed beam may correspond to a second beam gain that is less than the first beam gain and a second beam width that is greater than the first beam width.

In yet another example embodiment, a non-transitory machine-readable medium may comprise executable instructions that, when executed by a processor of a radio network node, facilitate performance of operations, comprising receiving a progressive paging configuration, comprising receiving at least one subpattern indication indicative of at least one beam pattern, wherein the progressive paging configuration is transmitted via a core network. The operations may further comprise receiving a paging request directed to at least one user equipment via the core network. Responsive to the paging request, the operations may further comprise transmitting a paging message directed to the at least one user equipment according to the at least one beam pattern indicated by the at least one subpattern indication. The operations may further comprise forming at least one formed beam corresponding to the at least one beam pattern indicated by the at least one subpattern indication. In an embodiment, the at least one beam pattern indicated by the at least one subpattern indication may comprise fewer beams than a baseline beam pattern.

BRIEF DESCRIPTION OF THE DRAWINGS

FIG. 3 illustrates an example beam pattern configuration and a progressive paging configuration.

FIG. 6 illustrates a timing diagram of another example embodiment.

FIG. 7 illustrates a flow diagram of an example embodiment method.

FIG. 8 illustrates a block diagram of an example method embodiment.

FIG. 9 illustrates a block diagram of an example radio access network node embodiment.

FIG. 10 illustrates a block diagram of an example non-transitory machine-readable medium embodiment.

DETAILED DESCRIPTION OF THE DRAWINGS

Figure 1:
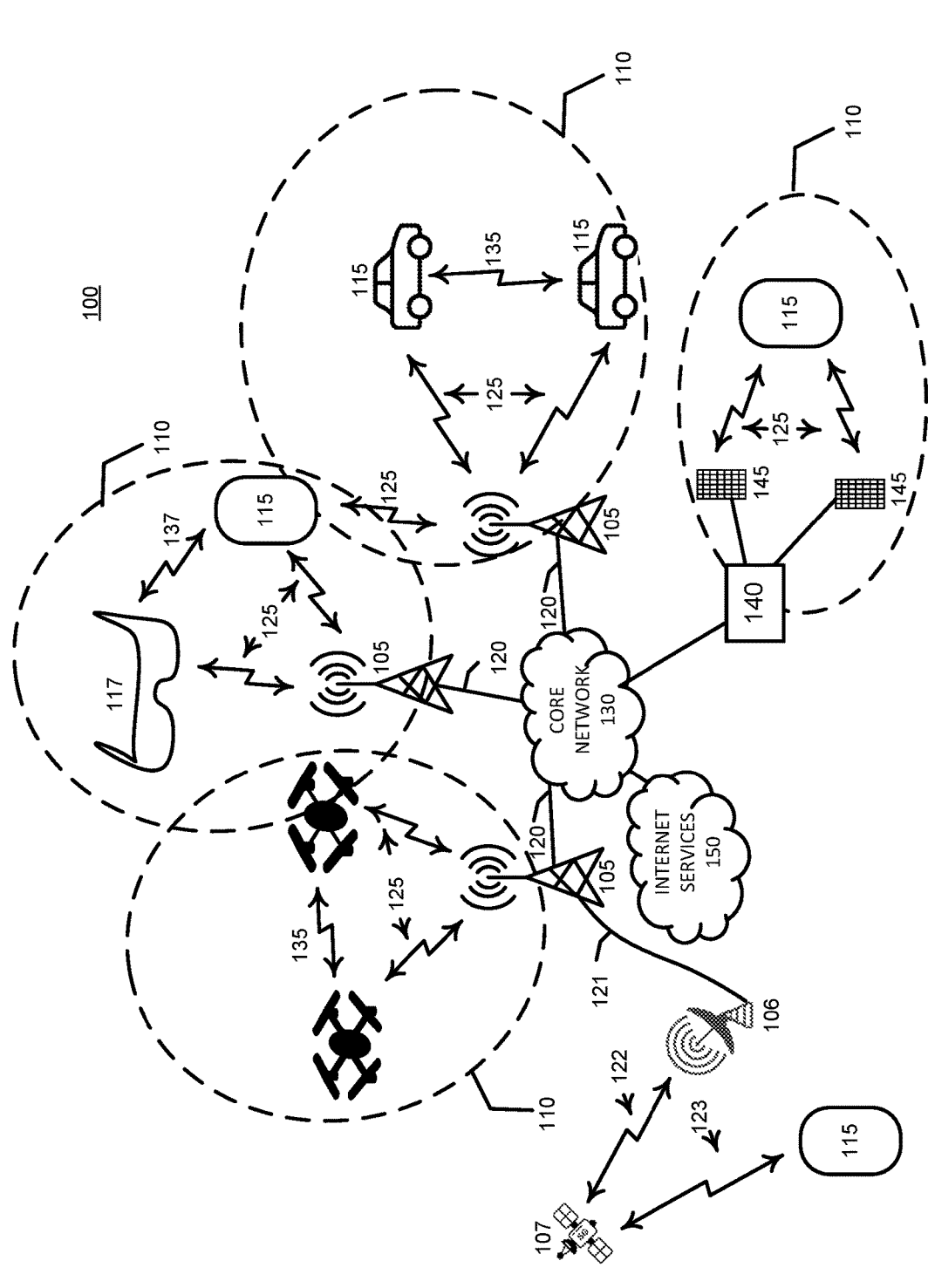
FIG. 1 illustrates wireless communication system environment.

As a preliminary matter, it will be readily understood by those persons skilled in the art that the present embodiments are susceptible of broad utility and application. Many methods, embodiments, and adaptations of the present application other than those herein described as well as many variations, modifications and equivalent arrangements, will be apparent from or reasonably suggested by the substance or scope of the various embodiments of the present application.

Accordingly, while the present application has been described herein in detail in relation to various embodiments, it is to be understood that this disclosure is illustrative of one or more concepts expressed by the various example embodiments and is made merely for the purposes of providing a full and enabling disclosure. The following disclosure is not intended nor is to be construed to limit the present application or otherwise exclude any such other embodiments, adaptations, variations, modifications and equivalent arrangements, the present embodiments described herein being limited only by the claims appended hereto and the equivalents thereof.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. In yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Turning now to the figures, FIG. 1 illustrates an example of a wireless communication system 100 that supports blind decoding of PDCCH candidates or search spaces in accordance with aspects of the present disclosure. The wireless communication system 100 may include one or more base stations 105, one or more UEs 115, and core network 130. In some examples, the wireless communication system 100 may be a Long Term Evolution (LTE) network, an LTE-Advanced (LTE-A) network, an LTE-A Pro network, or a New Radio (NR) network. In some examples, the wireless communication system 100 may support enhanced broadband communications, ultra-reliable (e.g., mission critical) communications, low latency communications, communications with low-cost and low-complexity devices, or any combination thereof. As shown in the figure, examples of UEs 115 may include smart phones, automobiles or other vehicles, or drones or other aircraft. Another example of a UE may be a virtual reality appliance 117, such as smart glasses, a virtual reality headset, an augmented reality headset, and other similar devices that may provide images, video, audio, touch sensation, taste, or smell sensation to a wearer. A UE, such as VR appliance 117, may transmit or receive wireless signals with a RAN base station 105 via a long-range wireless link 125, or the UE/VR appliance may receive or transmit wireless signals via a short-range wireless link 137, which may comprise a wireless link with a UE device 115, such as a Bluetooth link, a Wi-Fi link, and the like. A UE, such as appliance 117, may simultaneously communicate via multiple wireless links, such as over a link 125 with a base station 105 and over a short-range wireless link. VR appliance 117 may also communicate with a wireless UE via a cable, or other wired connection. A RAN, or a component thereof, may be implemented by one or more computer components that may be described in reference to FIG. 11.

Continuing with discussion of FIG. 1, base stations 105 may be dispersed throughout a geographic area to form the wireless communication system 100 and may be devices in different forms or having different capabilities. Base stations 105 and UEs 115 may wirelessly communicate via one or more communication links 125. A base station 105 may be referred to as a RAN node. Each base station 105 may provide a coverage area 110 over which UEs 115 and the base station 105 may establish one or more communication links 125. Coverage area 110 may be an example of a geographic area over which a base station 105 and a UE 115 may support the communication of signals according to one or more radio access technologies.

UEs 115 may be dispersed throughout a coverage area 110 of the wireless communication system 100, and each UE 115 may be stationary, or mobile, or both at different times. UEs 115 may be devices in different forms or having different capabilities. Some example UEs 115 are illustrated in FIG. 1. UEs 115 described herein may be able to communicate with various types of devices, such as other UEs 115, base stations 105, or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with core network 130 through one or more backhaul links 120 (e.g., via an S1, N2, N3, or other interface). Base stations 105 may communicate with one another over the backhaul links 120 (e.g., via an X2, Xn, or other interface) either directly (e.g., directly between base stations 105), or indirectly (e.g., via core network 130), or both. In some examples, backhaul links 120 may comprise one or more wireless links.

One or more of base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a bNodeB or gNB), a Home NodeB, a Home eNodeB, or other suitable terminology.

A UE 115 may include or may be referred to as a mobile device, a wireless device, a remote device, a handheld device, or a subscriber device, a wireless transmit receive unit ("WTRU"), or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, a personal computer, an end extended reality appliance, an extended reality processing unit, or a router. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or smart meters, among other examples.

UEs 115 may be able to communicate with various types of devices, such as other UEs 115 that may sometimes act as relays as well as base stations 105 and the network equipment including macro eNBs or gNBs, small cell eNBs or gNBs, or relay base stations, among other examples, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. Wireless communication system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by UEs 115. A carrier may be operated in a standalone mode where initial acquisition and connection may be conducted by UEs 115 via the carrier, or the carrier may be operated in a nonstandalone mode where a connection is anchored using a different carrier (e.g., of the same or a different radio access technology).

Communication links 125 shown in wireless communication system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications e.g., in a TDD mode).

A carrier may be associated with a particular bandwidth of the radio frequency spectrum, and in some examples the carrier bandwidth may be referred to as a "system bandwidth" of the carrier or the wireless communication system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communication system 100 (e.g., the base stations 105, the UEs 115, or both) may have hardware configurations that support communications over a particular carrier bandwidth or may be configurable to support communications over one of a set of carrier bandwidths. In some examples, the wireless communication system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE. A wireless communications resource may refer to a combination of a radio frequency spectrum resource, a time resource (e.g., a search space), or a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for a UE 115 may be restricted to one or more active BWPs.

The time intervals for base stations 105 or UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods e.g., depending on the length of the cyclic prefix prepended to each symbol period). In some wireless communication systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communication system 100 and may be referred to as a transmission time interval (TTI). In some examples, the TTI duration (e.g., the number of symbol periods in a TTI) may be variable. Additionally, or alternatively, the smallest scheduling unit of the wireless communication system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of UEs 115. For example, one or more of UEs 115 may monitor or search control regions, or spaces, for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115. Other search spaces and configurations for monitoring and decoding them are disclosed herein that are novel and not conventional.

A base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others).

In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of a base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., UEs 115 in a closed subscriber group (CSG), UEs 115 associated with users in a home or office). A base station 105 may support one or multiple cells and may also support communications over the one or more cells using one or more component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communication system 100 may include, for example, a heterogeneous network in which different types of the base stations 105 provide coverage for various geographic coverage areas 110 using the same or different radio access technologies.

The wireless communication system 100 may support synchronous or asynchronous operation. For synchronous operation, the base stations 105 may have similar frame timings, and transmissions from different base stations 105 may be approximately aligned in time. For asynchronous operation, base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communication system 100 may be configured to support ultra-reliable communications or low-latency communications, or various combinations thereof. For example, the wireless communication system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). Communication link 135 may comprise a sidelink communication link. One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of UEs 115 communicating via D2D communications may utilize a one-to-many (1:M) system in which a UE transmits to every other UE in the group. In some examples, a base station 105 facilitates the scheduling of resources for D2D communications. In other cases, D2D communications are carried out between UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more RAN network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. Core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for UEs 115 that are served by the base stations 105 associated with core network 130. User IP packets may be transferred through the user plane entity, which may provide IP address allocation as well as other functions. The user plane entity may be connected to IP services 150 for one or more network operators. IP services 150 may comprise access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices e.g., radio heads and ANCs) or consolidated into a single network device (e.g., a base station 105).

The wireless communication system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communication system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communication system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communication system 100 may utilize both licensed and unlicensed radio frequency spectrum bands. For example, the wireless communication system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, a base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by a base station 105 in different directions and may report to the base station an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). A UE 115 may report feedback that indicates precoding weights for one or more beam directions, and the feedback may correspond to a configured number of beams across a system bandwidth or one or more sub-bands. A base station 105 may transmit a reference signal (e.g., a cell-specific reference signal (CRS), a channel state information reference signal (CSI-RS)), which may be precoded or unprecoded. A UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communication system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The evolution of communication networks has witnessed remarkable advancements over the past decades. A significant extension of 5G's potential may lie beyond the conventional terrestrial infrastructure, giving rise to what are known as 5G Non-Terrestrial Networks ("NTN").

Non-Terrestrial Networks encompass a diverse range of technologies and architectures that may comprise space-based, airborne, and maritime platforms to enhance global communication capabilities. Integration of 5G with non-terrestrial environments may facilitate connectivity being established, maintained, and optimized to remote and under-served regions.

Satellites equipped with 5G capabilities constitute an aspect of 5G NTN. Satellites, positioned in low Earth orbit ("LEO"), medium Earth orbit ("MEO"), or geostationary orbit ("GEO"), may form an intricate web of interconnected nodes. The satellites can provide widespread coverage, offering high-speed data connections, low latency communication, and global mobility. Satellites may facilitate broadband access in rural and remote areas, disaster-stricken regions, and on moving vehicles, ships, and aircraft, thus bridging the digital divide.

Satellite-based NTN can bridge connectivity gaps in remote and rural areas, provide disaster recovery communication, and offer enhanced coverage for maritime and aeronautical services. High-altitude platforms and drones equipped with cellular capabilities can serve as temporary network relays for events, emergencies, or areas with signal-strength coverage deficiencies. such applications may benefit not only traditional voice and data services but also for technologies, such as, for example, Internet of Things ("IoT"), wherein connectivity is typically a desirable, or a fundamental requirement.

A non-terrestrial base station 106, which may comprise a satellite antenna, may be coupled to core network 130. Non-terrestrial base station 106 may communicate with satellite 107, which may communicate with a user equipment 115. Non-terrestrial base station 106, which may be referred to as a non-terrestrial network ("NTN") gateway, and satellite 107 may facilitate delivering traffic corresponding to a radio access network, which may comprise RAN nodes 105, core network 130, backhaul links 120, and long-range wireless links 125, to user equipment that may be located beyond coverage or a RAN node 105. Links 121 between RAN nodes 105 and satellite base station/gateway 106 may comprise coaxial, fiber, or wireless links that may be similar to links 120. Links 122 to satellite node 107 and links 123 from satellite/node 107 to UE 115 may comprise line-of-sight microwave signal transmission. A UE 115 may be configured with at least one antenna, or at least one processor, to facilitate transmitting or receiving microwave signals to/from satellite node 107. Description herein of a radio node or a radio network node may be a reference to either a RAN node 105 or a satellite node 107. Reference to a satellite node may comprise a reference to satellite 107, base station gateway 107, or a combination of satellite 107 and base station/gateway 106.

Paging is a fundamental procedure via a long-range wireless radio interface, such as a 5G wireless interface via links 125, wherein RAN node 105 may send a paging message, or paging request, towards an idle or inactive user equipment 115 within a coverage area/range corresponding to the RAN node, to facilitate the user equipment in transitioning to a connected state and possibly receiving an incoming call or data session, for example for receiving a system information update. However, since the paging message is destined toward an idle, or inactive, user equipment 115, RAN node 105 is not aware of a best serving downlink beam as determined by the user equipment. Thus, a RAN node 105 typically repeats transmission of the paging message/request, or indications corresponding thereto, via configured resource sets, wherein each resource set may be associated with an available downlink beam. Therefore, the more available downlink beams used to transmit a paging message/request, the more paging repetitions of transmission of the paging message/request and thus the more control signalling overhead that the RAN node uses or consumes. Despite paging being a well-known challenge with respect to ground RAN nodes, paging is not deemed as a critical limitation with ground-based RAN nodes due to the limited geographical coverage of a given RAN node leading to a manageable (e.g., with respect to resources) number of downlink beams needed to cover a coverage area corresponding to the RAN node, and thus a manageable number of paging message repetitions may be needed for a paging message transmitted by a ground-based RAN node 105 to an idle/inactive UE 115.

NTNs may integrate with and facilitate 5G (or later generation) wireless communication networks. For example, a 5G RAN node may be connected to a large NTN antenna gateway 106, which may be connected to at least a single moving satellite 107, thus facilitating geographically wide cellular coverage. Thus, NTNs can greatly enhance, or expand, limited coverage of ground RAN node, which may make use of NTNs cost efficient in remote rural areas, mountainous areas, and generally geographic areas where ground cellular deployments are either not possible or not cost efficient. However, integration of NTNs with ground cellular networks presents several unique implementation challenges that may result in performance degradation that might not occur with ground-based RAN nodes. One performance challenge that can result from use of NTNs top facilitate 5G coverage relates to handling, in an efficient manner, paging operations that are designed for transmission via the ground-based radio interface. Paging over cellular/5G interfaces involves the radio network transmitting a paging message/request, or indication of a paging message/request, towards a certain idle/inactive device, or group of idle/inactive devices, requesting the device(s) to transition to connected state, for example to receive an incoming call. However, a ground RAN node does not have information regarding a best serving downlink beam received seen by a paged idle user equipment since the paged user equipment is in idle state and thus not connected to the RAN node. Thus, transmission of a paging message is repeated by a ground RAN node via all available downlink beams/directions at the expense of increased signaling resource overhead corresponding to transmission via each beam. Even with adopting a large number of sharp downlink beams, transmitting a paging message via all downlink beams is typically not problematic for a ground RAN due to the limited geographic coverage corresponding to a given RAN node (e.g., a number of downlink beams and corresponding per-beam, per-repetition paging payload) and is a reasonable process with respect to resource consumption (time, frequency, power) versus paging latency.

However, for NTN deployments that are integrated with ground-based radio access networks, where each NTN satellite covers an extensively large geographical area as compared to a single ground RAN node (e.g., multiple cities or even countries compared to a relatively small area corresponding to a RAN node), the number of sharp downlink beams that cover the larger geographic area significantly increases, leading the signaling overhead corresponding to repeated transmission of a paging message repetition being significantly larger than for a ground-based RAN node, thus overwhelming an NTN.

With conventional techniques, an NTN may adopt use of denser/fatter (e.g., geographically wider) downlink beams, where each covers a much larger geographic area than sharper downlink beams, thus reducing the number of downlink beams to cover an area, thus respectively reducing the number of per-beam repetitions of a paging message. However, denser beams have a lower beamforming gain and boresight strength, and thus have a reduced coverage distance of the serving NTN satellite, which may potentially lead to frequent NTN paging failures and NTN link failures.

Embodiments disclosed herein may comprise progressive NTN paging, wherein paging overhead is dynamically reduced at the expense of a potential increase in paging latency. Upon receiving a paging message/request/indication directed towards an idle/inactive user equipment, an NTN node may begin a novel progressive paging process by transmitting the paging message according to a configured first subset/pattern of downlink beams that are fatter/denser, though smaller in number, than a baseline/default downlink beam used for conventional all-beam paging. The fatter/denser beam may be formed by combining all of, or part of, available baseline downlink beams. On condition of failing to receive a paging response from a paged user equipment after transmitting a paging message via the fatter/denser downlink beam patter, the NTN node may transmit the paging message according to a second configured subset of sharper, though larger in number (as compared to the configured first subpattern), downlink beams (though still fatter/wider than baseline beams), which may be formed, or constructed, based on a second configured combination of all of, or part of, available baseline downlink beams. The process may progress accordingly, with progressively different beam patterns comprising more, and more-narrow, formed beams, until a paging response from the target user equipment is received.

As an example, in a case of eight available downlink beams, an NTN node may transmit a paging request via a first beam subset that comprises only two fatter beams (e.g., fatter than a baseline beam), wherein each fat beam is an average of four successive/sequential baseline downlink beams. (In reality thousands of baseline downlink beams are potentially available, thus resulting in an enormous amount of paging resources used and a reduction in capacity and/or spectral efficiency corresponding to an NTN node if transmission of a paging message were repeated via each baseline beam.) If no paging response is received from a user equipment being paged, the NTN node may re-transmit the same paging message via a second beam subset that comprises more (e.g., four instead of two) sharper beams, where each is the average of two successive/sequential baseline downlink beams, and so until the NTN node reverts back to repeating the paging transmission over all available downlink beams if so configured (e.g., conventional paging via all baseline beams if co configured). Accordingly, embodiments disclosed herein may facilitate saving significant paging overhead when a paged idle/inactive user equipment is close enough to the NTN node to detect/decode/receive a paging message via one of the formed fatter beams, and thus the NTN node can avoid a full cycle of paging message repetitions using all available, sharper, baseline beams. A potential disadvantage of using embodiments disclosed herein may be an increased paging delay that may occur if a paged user equipment is far enough away from the NTN node that a paging message transmitted by a formed beam that is fatter yet shorter-in-reach than a baseline beam cannot be received by the user equipment, and thus one or more additional paging transmission according to progressively more formed beams that are narrower and longer-in-reach than beams of a previous subpattern may be needed until a target user equipment can potentially decode the transmitted paging message. Although an increase in paging delay may occur as a result of progressive paging as disclosed herein, experiencing longer access and paging delays for NTN traffic may be reasonable and acceptable since propagation delay corresponding to delivery of traffic from a satellite to a user equipment is typically large with respect to transmission from a ground-based RAN node ground RANs. Thus, additional paging delay may be acceptable because a user may not perceive the delay since propagation delay from a satellite typically results in delayed connection anyway. Furthermore, according to embodiments disclosed herein, additional paging delay may be adjusted by configuring more paging subpatterns, or less paging subpatterns, to potentially achieve more efficient resource usage but more access delay, or potentially less efficient resource usage but less access delay, respectively.

Non-Terrestrial Progressive Paging

According to embodiments described herein, a ground RAN node, or NTN node, may receive progressive paging configurations, from a core network, including a list of supported paging beam sub-patterns, and associated beam information corresponding to each beam pattern. It will be appreciated that although an NTN node may benefit the most from embodiments disclosed herein, techniques disclosed herein may be of benefit to a ground-based RAN node. Thus, use of "radio network node" may be interpreted as referring to a ground-based RAN node or to a satellite node, which may comprise a gateway 106 or a satellite 107.

In an example, a potential paging beam sub-pattern may comprise information corresponding to paging via all available baseline downlink beams, and thus no special beam forming information would be needed to implement such a beam pattern. However, in another example, a beam pattern configuration may comprise paging beam sub-pattern information that may be used by a radio network node facilitate transmission of a paging message via a set, or pattern, of constructed/formed downlink beams, wherein each formed beam is formed by applying an average, or some other mathematical function/operation, to at least one baseline downlink beam of baseline downlink beams available for use by the radio network node (e.g., averaging each two successive/sequential downlink beams in a baseline pattern of all available downlink beams) to result in a subset of paging beams with each resulting in half as many formed downlink beams, each having half the range of the at least one baseline beam, but with wider angular dispersion than a baseline downlink beam.

Accordingly, radio network node may broadcast, as part of a broadcast system information block message, node-specific progressive paging information, which may be referred to as a progressive paging configuration. A progressive paging configuration may include an ordered set of periodic beam-paging sub-patterns, that defines at least one formed beam and corresponding timing and frequency resource information. For a paging beam sub-pattern indicated in a progressive paging configuration, a waiting period (in ms or slots or frames) may be associated with a configured sub-pattern, for use by the radio network node to facilitate waiting for the potential paging response from a user equipment being paged. For example, the radio network node may be configured to broadcast a paging message according to a first paging sub-pattern configured via a progressive paging configuration and may be configured to facilitate waiting a first wait period after transmitting the paging message to determine whether a response has been received in response to the transmitted paging message transmitted via any of the formed beams according to the configured first paging pattern/subpattern. (The term subpattern may refer to a beam pattern usable by the radio network node that is indicated in a progressive paging configuration and that is calculated, or determined, based on information configured in the radio network node via a previously-transmitted beam pattern configuration). If no paging response is received within, during, or by the end of, the first wait period, the radio network node may be configured to facilitate transmitting the paging message according to a second, or next, paging sub-pattern configured via the progressive paging configuration, and the radio network node may be configured to facilitate waiting again during a second wat period that corresponds to the second beam sub-pattern. Upon receiving a paging message/request from a core network (or NTN gateway if the radio network node comprises a satellite 107), the network node may be configured to facilitate determining at least one timing resource corresponding to a device-specific of device-group-specific paging occasion associated with a user equipment, or group of user equipment, to be paged by the paging message. Accordingly, the network node may be configured to facilitate determining a paging sub-pattern that overlaps in time with the occasion determined to be associated with target user equipment or target group of user equipment. The radio network node may be configured to facilitate transmission of the paging request, towards the to-be-paged device, according to a subset, or subpattern, of downlink beams that are formed, or constructed, based on information contained in a beam pattern configuration and based information contained in a progressive paging configuration. One or more beams of the subset of beams may be determined by applying a mathematical function, such as averaging, to beam vectors or beam matrices, associated with beams that may be combined to form a shorter, fatter/wider-dispersion, beam. After expiration of transmitting of a paging message via beams of a subpattern of formed beams, the radio network node may halt transmission of the paging message during a wait period associated with the subpattern.

On condition of receiving a paging response from a target user equipment, from devices belonging to a paged group of targeted user equipment, the radio network node may stop the current paging cycle and reset a paging pattern to be used for transmission of a future paging message to a first paging sub-pattern in the ordered subpatterns indicated in the progressive paging configuration.

On condition of not receiving, or failing to receive, a paging response during a configured waiting period associated with a subpattern of formed short and wide beams, the radio network node may begin transmission of the paging message according to a second of the ordered paging beam sub-pattern indicated in the progressive paging configuration. Using conventional techniques, a user equipment uses a precoding vector or matrix corresponding to a best beam as determined by the user equipment (e.g., a beam that the user equipment determines has a strongest signal strength of all beams that the user equipment can reasonably detect and decode). According to embodiments disclosed herein, a paged target user equipment, in potentially detecting and decoding a paging message/request, may use dynamic paging detection, wherein, unlike with the conventional techniques, the target user equipment may adopt the decoding vector or matrix of a calculated downlink beam that may be carrying the paging message according to a current/active paging beam sub-pattern.

According to conventional techniques, a static paging behavior, wherein a received paging indication is always broadcast and repeated on all available downlink beams, each repetition of a paging is transmitted using a precoding vector or matrix corresponding to the downlink beam carrying it (a vector or matrix is static and does not differ from beam to beam of available downlink base line beams). According to embodiments disclosed herein, a radio network node may dynamically determine and calculate a current subset of formed, or constructed, beams, which may be time variant depending on an achievable paging performance, for carrying paging indications, by using combining precoding vectors/matrices to construct/form new beams usable for transmission of one or more paging messages.

With respect to behavior at a user equipment, according to conventional techniques, a user equipment always adopts precoding vectors/matrices corresponding to a best baseline downlink beams determined by the user equipment. However, since paging beamforming is highly dynamic using embodiments disclosed herein, a user equipment implementing embodiments disclosed herein may dynamically determine and calculate new precoding vectors, associated with one or more beams, corresponding to a beam subpattern indicated in a progressive paging configuration, by applying a mathematical function to vectors or matrices associated with one or more baseline downlink beams, to be used for decoding a paging occasion. Thus, for a non-moving device, for which a determined best baseline downlink beam does not change, a single precoder of such beam will be always used for paging detection according to conventional techniques. However, using embodiments disclosed herein, a user equipment may determine and calculate a new precoder for each of one or more of its paging occasions to match changes to paging transmission behavior implemented by a radio network node according to embodiments disclosed herein.

Figure 2:
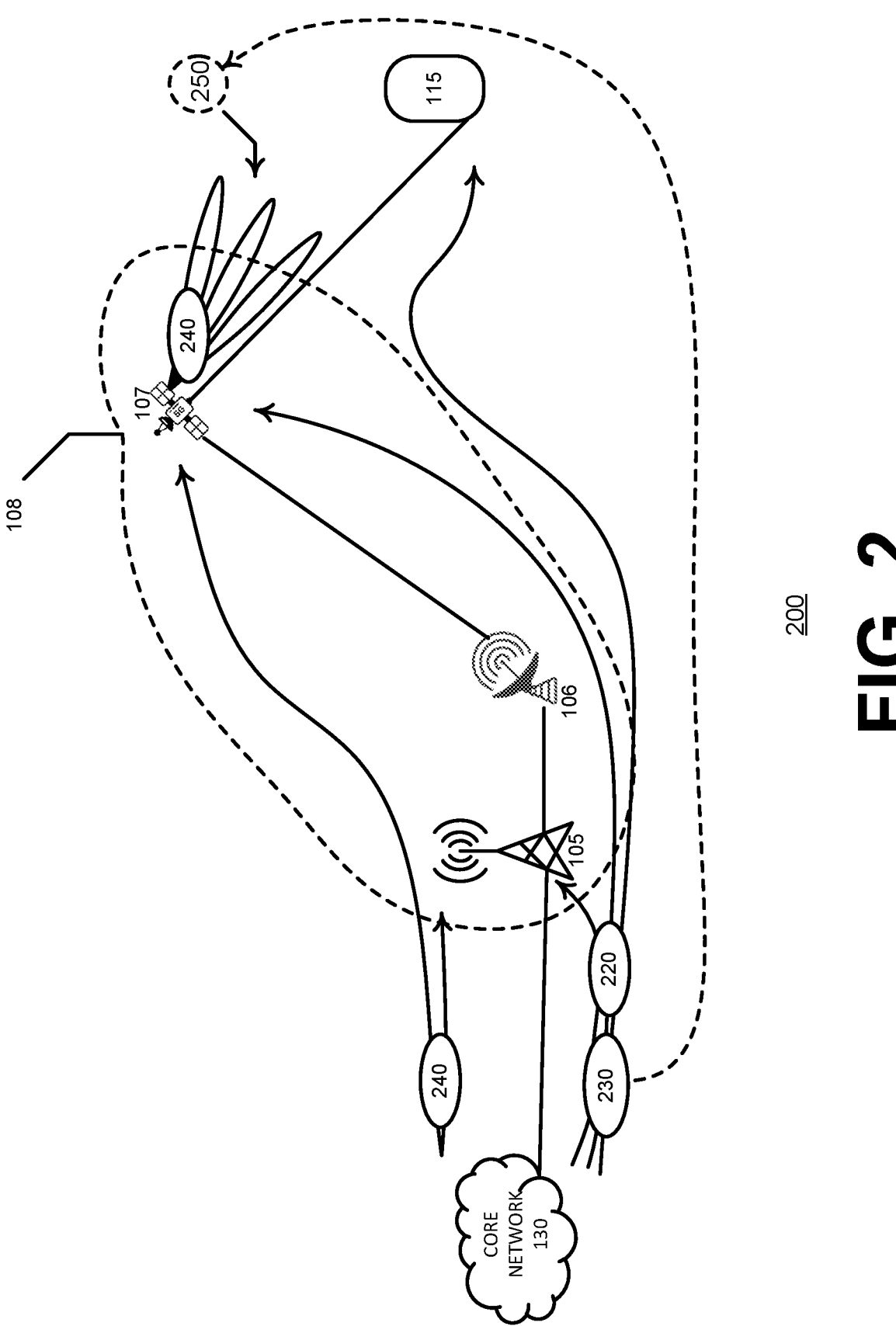
FIG. 2 illustrates an environment with a satellite base station and satellite facilitating communication of traffic corresponding to a radio access network.

Turning now to FIG. 2, the figure illustrates ground RAN node 105, base station 106, or NTN node 107, any one or more of which may be referred to as a radio network node. For purposes of description, radio network node 108 may comprise one or more of RAN node 105, gateway 106, or satellite 107. Radio network node 108 may receive a beam pattern configuration 220 that may comprise beam pattern information corresponding to at least one beam pattern. Radio network node 108 may receive a progressive paging configuration 230. Beam pattern configuration 220 or progressive paging configuration 230 may be directed to the radio network node by core network 130. Beam pattern configuration 220 or progressive paging configuration 230 may be directed to user equipment 115 by core network 130 or by the radio network node.

As shown in FIG. 3, configuration 220 may comprising information corresponding to supported paging beam patterns 222, or corresponding pattern indications, where each beam pattern is associated with correspond baseline beam information in baseline beam information field 224, or indications of the information shown in the figure field 224, for which a special mathematical calculation should be performed to generate beams of a sub-set of paging beams indicated in progressive paging configuration 230. For example, a paging sub-pattern formed by node 108 by performing beam averaging with respect to each of multiple baseline downlink beams indicated in field 224A of configuration 220, that may be indicated in a field 240A-240C in configuration 230, effectively results in no change of paging behavior with respect to conventional techniques (e.g., each new calculated paging beam indicated in field 224A corresponds to the same baseline downlink beam being used to calculate a new beam according to the information contained in filed 224A). In another example, another paging sub-pattern may be formed by performing beam averaging of each of two consecutive baseline downlink beams indicated in field 224B, which results in a new sub-set of beams (new beam precoders, new beam directions, new beam width, etc.) with each newly formed/calculated beam having a range of half of the available baseline downlink beams but with a wider beam dispersion. In an embodiment, configuration 220 may be directed to node 108 before configuration 230. In an embodiment, updates to configuration 230 may be directed to node 108 more frequently than updates to configuration 220 are directed to node 108. Thus, in an embodiment, configuration 220 may be more permanently (although not totally permanently) configured into node 108 (configuration 220 may also be configured in a user equipment) than configuration 230.

Configuration 230 may be used to dynamically indicate to node 108 one or more beam subpatterns, which may be a subset of patterns indicated in configuration 220, to be progressively used in an order configured via configuration 230 to transmit one or more paging messages to one or more user equipment. Information usable by node 108 to calculate formed beams, for example an indication of a mathematical function to be applied to beams identified in a field 224 in configuration 220, may be used by the node to calculate beams of one or more beam subpatterns indicated in fields 240A through 240 C. Wait periods to be applied by node 108 after facilitating transmission of a paging message via a pattern indicated in a field 240 may be indicated in a field 244, respectively corresponding to subpattern indicated in the field 240. For example, after node 108 may facilitate transmission of a paging message according to a beam pattern indicated in field 240B, the node may wait an amount of time, an amount of slots, or an amount of other configured units of measure, as indicated in field 244B, before beginning transmission of the paging message according to a beam pattern indicated in field 240C if a response to a paging message transmitted according to a beam pattern indicated in field 240B was not received by the node by an end of the period defined by information contained in field 244B.

Accordingly, as shown by FIG. 3, and upon receiving the progressive paging configurations, a node 108 may compile and broadcast (towards idle mode devices as part of the broadcast system information blocks) progressive paging information. The progressive paging information may be contained in progressive paging configuration 230, and may comprise information including an ordered list, or a list of paging beam patterns arranged in an order, so that paging according to the beam pattern order is implemented by a radio network node that received the progressive paging configuration. For example, as shown in FIG. 3, an order for performing paging may be for a node performing the paging to facilitate transmission of a paging message according to a paging beam pattern indicated in field 240A before transmission of the paging message according to a paging beam pattern indicated in field 240B, which would be performed before transmission of the paging message according to a paging beam pattern indicated in field 240C is performed. Progressive paging configuration 230 may comprise timing resource information and periodicity information, corresponding, respectively, to beam patterns indicated in fields 240A-240C. Thus, a first active paging beam pattern (e.g., a pattern indicated in field 240A) may be implemented during a configured time duration and with certain beam periodicity, followed by a second paging beam sub-pattern, and so forth.

For each indicated paging beam sub-pattern indicated in field 240A-240C, a corresponding wait period may be configured, respectively, in fields 244A-244C. Information indicated in wait period fields 244A-244C may be usable by a node to implement wait periods after transmission of a paging message according to beam patterns indicated in fields 240A-240C, respectively. During a configured wait period, transmission of a paging message by a node may be halted.

Figure 4:
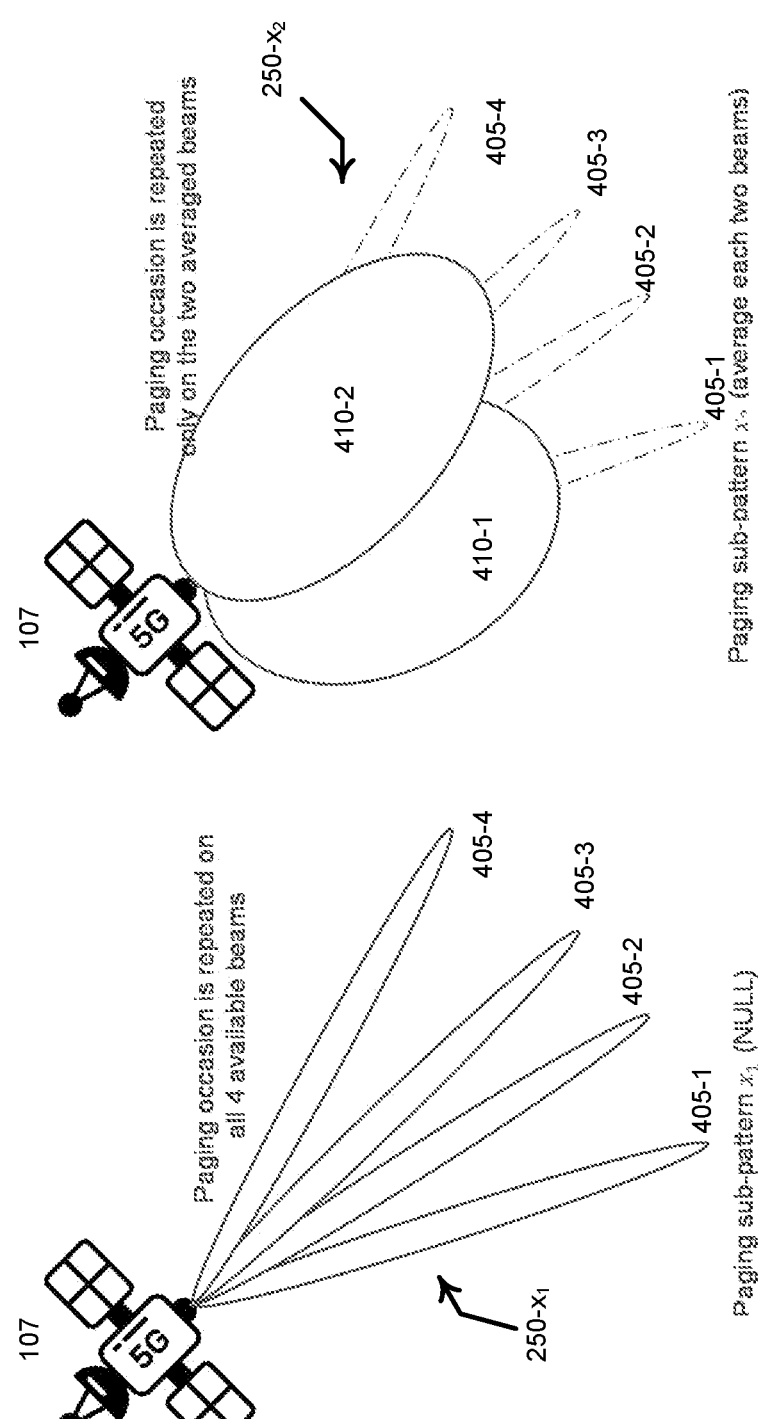
FIG. 4 illustrates an example environment with a satellite radio node transmitting a paging message according to a progressive paging configuration.

FIG. 4 illustrates an example embodiment of paging sub-patterns wherein a first paging beam pattern 250-$_{x1}$ corresponds to a conventional paging pattern wherein transmission of a paging message is repeated sequentially via baseline beam 405-1, then 405-2, then 405-3, and then via 405-4. However, second paging pattern 250-$_{x2}$ corresponds to a paging pattern configured via field 240C in progressive paging configuration 230 shown in FIG. 2, wherein transmission of a paging message paging is sequentially facilitated first via formed downlink beam 410-1, which may be formed by applying a mathematical function to vector or matrix information corresponding to baseline beams 405-1 and 405-2. In the example, the mathematical function may comprise an averaging function. As shown in the figure, beam 410-1 has a shorter dispersion relative to satellite 107 than baseline beams 405-1 or 405-2, from which beam 410-1 is formed, but beam 410-1 has a wider, or fatter, beam dispersion than either of baseline beams 405-1 or 405-2. After transmitting a paging message via beam 410-1, satellite 107 may facilitate transmission of the paging message via beam 410-2, which may be formed by applying an averaging function to baseline beams 405-3 and 405-4. The number of paging transmission repetitions of the paging message is cut in half when pattern 250-$_{x2}$ is used, according to configuration 230, instead of transmission according to pattern 250-$_{x1}$.

Figure 5:
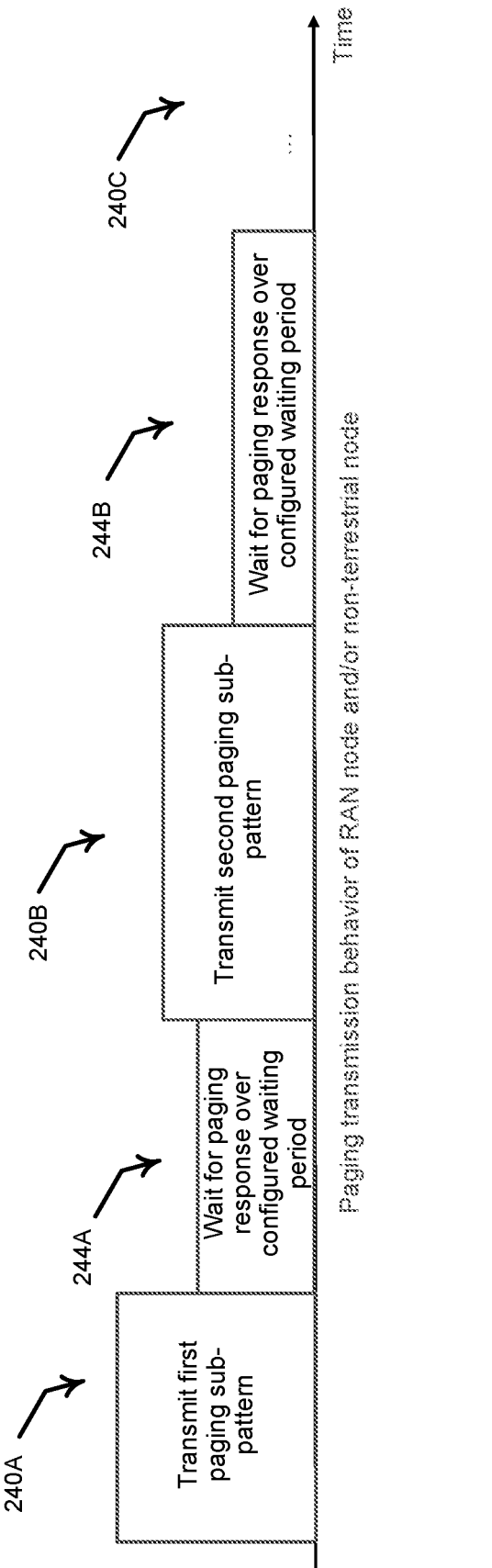
FIG. 5 illustrates behavior of a radio node paging a user equipment according to a progressive paging configuration.

FIG. 5 illustrates example paging transmission behavior according to an embodiment disclosed herein. Transmission of a paging message may be facilitated by a radio network node according to a beam pattern indicated in field 240A of a progressive patient configuration 230. Beams corresponding to the beam pattern indicated in field 240A may be formed or constructed using vectors or matrices associated with one or more first baseline beams as indicated in a corresponding field 224 in configuration 220. Accordingly, and if configured via a progressive paging configuration 230 with one or more wait periods indicated in one or more fields 244, the radio network node may halt active paging transmission during the configured wait period indicated in field 244A associated in configuration 230 with the beam pattern indicated in field 240A. A wait period may extend a configured time for potentially receiving a response to the paging message after a paging message has been transmitted according to beams indicated in the pattern indicated in field 240A. On condition of receiving one or more paging responses in response to a paging message transmitted according to the pattern indicated in field 240A, the radio network node may stop the current active paging process and may reset the paging cycle to restart from the first paging beam sub-pattern indicated at the top of configuration 230 in fields 240 when future paging indications are received and subsequently transmitted to target user equipment.

However, on condition of not receiving expected one or more paging response(s) during configured wait period indicated in field 244A after transmitting the paging message according to the pattern indicated field 240A, the radio node may activate a second paging beam pattern indicated in field 240B of configuration 230, and transmit the paging message according to calculated beams indicated in field 240B according to information that may be contained in one of fields 224 associated in configuration 220 with a pattern indication in a corresponding field 222 that may also be indicated in field 240B.

Turning now to FIG. 6, the figure illustrates a timing diagram of an example embodiment method 600. At act 610, a radio network node 108, or a radio node, may receive a progressive paging configuration directed to the node by a core network. The progressive paging configuration may comprise one or more paging beam pattern indications (where a NULL sub-pattern implies conventional uniform paging repetitions over all available beams), or one or more wait period indications that may be usable to extend a time for receiving a response to a paging message transmitted according to paging pattern(s) associated with the paging patter(s). At act 620, radio network node 108 may facilitate transmission of, or broadcasting of, the progressive paging configuration towards idle mode user equipment within a coverage range of the radio network node. At act 625, the radio node may determine and compile beams of a paging pattern by applying a mathematical function to baseline beam information that corresponds to beams to be used to form beams of one or more patterns indicated in the progressive pattern indication based on information contained in a beam pattern configuration.

At act 630, on condition of receiving a paging request/message, transmitted via a core network and directed towards a certain at least one user equipment 115, radio network node may determine timing information/resources corresponding to a device paging occasion associated with the at least one user equipment. At act 635, having determined timing information associated with the device paging occasion corresponding to the at least one UE 115, radio network node 108 may determine a current paging beam that corresponds to an active paging aggregate cycle/pattern and that overlaps in time with the device paging occasion. At act 640, the radio network node may transmit the paging request via the determined paging occasion towards the paged device, using the precoding vector of the respective beam of the current aggregate paging beam pattern (e.g., a first beam pattern indicated in a top field 240 in configuration 230). At act 645, on condition of a paging message having been transmitted on all beams corresponding to a beam pattern indicated in the current field 240 of configuration 230, radio network node may halt paging transmission during a configured wait response period associated in the progressive paging configuration 230 with the current active paging beam pattern. At act 650, on condition of having received a connection establishment request from paged/target user equipment device 115 during, or at least by the end of, paging wait period, radio network node 108 may stop paging and may not transmit to paged UE 115 the paging message according to a pending, or next, paging pattern (next relative the current pattern used for transmission at act 640). At act 655, on condition of having not received a connection establishment request from paged user equipment 115 during, or by the end of, a paging wait period associated in the progressive paging configuration with the paging period used to transmit the paging message at act 645, radio network node may facilitate activation, and transmission of the paging message according to, the next paging pattern of ordered paging patterns indicated in the progressive paging configuration.

Turning now to FIG. 7, the figure illustrates a flow diagram of an example embodiment 700. Method 700 begins at act 705. At act 710, a radio network node, which may comprise a radio access network node, a satellite gateway, a satellite, or a combination of a satellite and a satellite gateway, may receive one or more beam pattern configurations or progressive paging configurations. At act 715, the radio network node may receive a paging message directed to one or more target user equipment to be paged. At act 720, the radio node may determine one or more beams indicated in a progressive paging configuration received direct using, or based on, information contained in a beam pattern configuration received at act 710. At act 725, the radio node may transmit the paging message received at act 715 according to a first-in-order subpattern indicated in a progressive paging configuration received at act 710. At act 730, the radio network node may wait during a wait period associated in the progressive paging configuration with the first sub pattern. At act 735, the radio node may determine whether a response to the paging message transmitted according to the first paging subpattern at act 725 has been received.

If a determination is made at act 735 that a response to the paging message has been received by the network node, the network node may stop paging at act 760, establish a connection with the paged, or targeted, user equipment, and method 700 advances to act 770 and ends.

Returning to description of act 735, if the radio node determines that a response to the paging message transmitted at act 725 has not been received, method 700 advances to act 740. At act 740, the radio node may progress to a next-in-order subpattern indicated in a progressive paging configuration received at act 710 (e.g., corresponding to an order of subpatterns listed in the progressive paging configuration), and may transmit the paging message according to the next-in-order subpattern. As an example and in reference to FIG. 3, an order of paging beam sub patterns may be that a pattern indicated in field 240A is a first paging beam subpattern, a pattern indicated in field 240B is a next-in-order subpattern after the first paging beam subpattern, and a paging beam subpattern indicated in field 240C is a next-in-order subpattern after the previous next-in-order subpattern. At act 745, the radio node may wait a next wait period, associated in a progressive paging configuration received at act 710 with the next-in-order subpattern progressed to, or advanced to, at act 740. At act 750, the network node may determine whether all sub patterns indicated in a progressive paging configuration received at act 710 have been used to transmit the paging message received at act 715. If a determination made at act 750 is that all subpatterns indicated in the progressive paging configuration have not been used to transmit the painting message received at act 715, method 700 returns and continues at act 735.

If a determination is made at act 750 that all subpatterns indicated in a progressive paging configuration have been used to transmit the paging message received at act 715 to one or more target user equipment, method advances to act 755 and the radio node may transmit the paging message received at act 715 using all baseline beams. At act 760, the radio network node may stop paging, establish a connection with the paged, or targeted, user equipment, and method 700 may end at act 770.

Turning now to FIG. 8, the figure illustrates an example embodiment method 800 comprising at block 805 facilitating, by a radio network node comprising a processor, receiving, from a first network component, a beam pattern configuration comprising beam pattern information corresponding to at least one beam pattern; at block 810 facilitating, by the radio network node, receiving, from a second network component, a progressive paging configuration comprising at least one subpattern indication indicative of at least one of the at least one beam pattern; at block 815 facilitating, by the radio network node, receiving, from a third network component, a paging request directed to a user equipment; and at block 820 responsive to the paging request, facilitating, by the radio network node, transmitting a paging message to the user equipment according to the at least one of the at least one beam pattern indicated by the at least one subpattern indication.

Turning now to FIG. 9, the figure illustrates an example radio access network node 900, comprising at block 905 a processor configured to process executable instructions that, when executed by the processor, facilitate performance of operations, comprising receiving a beam pattern configuration comprising beam pattern information corresponding to at least one beam pattern, wherein the beam pattern configuration is transmitted via a core network; at block 910 receiving a progressive paging configuration comprising at least one subpattern indication indicative of at least one of the at least one beam pattern, wherein the progressive paging configuration is transmitted via the core network; at block 915 receiving a paging request directed to at least one user equipment, wherein the paging request is transmitted via the core network; at block 920 responsive to the paging request, transmitting a paging message directed to the at least one user equipment according to the at least one of the at least one beam pattern indicated by the at least one subpattern indication; at block 925 wherein the progressive paging configuration comprises at least one wait period associated with the at least one of the at least one subpattern indication, and wherein the operations further comprise; at block 930 waiting a first wait period of the at least one wait period after a first transmitting of the paging message to the at least one user equipment according to a first pattern of the at least one of the at least one beam pattern indicated by a first subpattern indication of the at least one subpattern indication; and at block 935 based on failing to receive a paging response from the at least one user equipment as late as an occurrence of an end of the first wait period, transmitting the paging message to the at least one user equipment according to a second pattern of the at least one of the at least one beam pattern indicated by a second subpattern indication of the at least one subpattern indication.

Turning now to FIG. 10, the figure illustrates a non-transitory machine-readable medium 1000 comprising at block 1005 executable instructions that, when executed by a processor of a radio network node, facilitate performance of operations, comprising receiving a progressive paging configuration, comprising at least one subpattern indication indicative of at least one beam pattern, wherein the progressive paging configuration is transmitted via a core network; a block 1010 receiving a paging request directed to at least one user equipment via the core network; at block 1015 responsive to the paging request, transmitting a paging message directed to the at least one user equipment according to the at least one beam pattern indicated by the at least one subpattern indication; and at block 1020 forming at least one formed beam corresponding to the at least one beam pattern indicated by the at least one subpattern indication.

Figure 11:
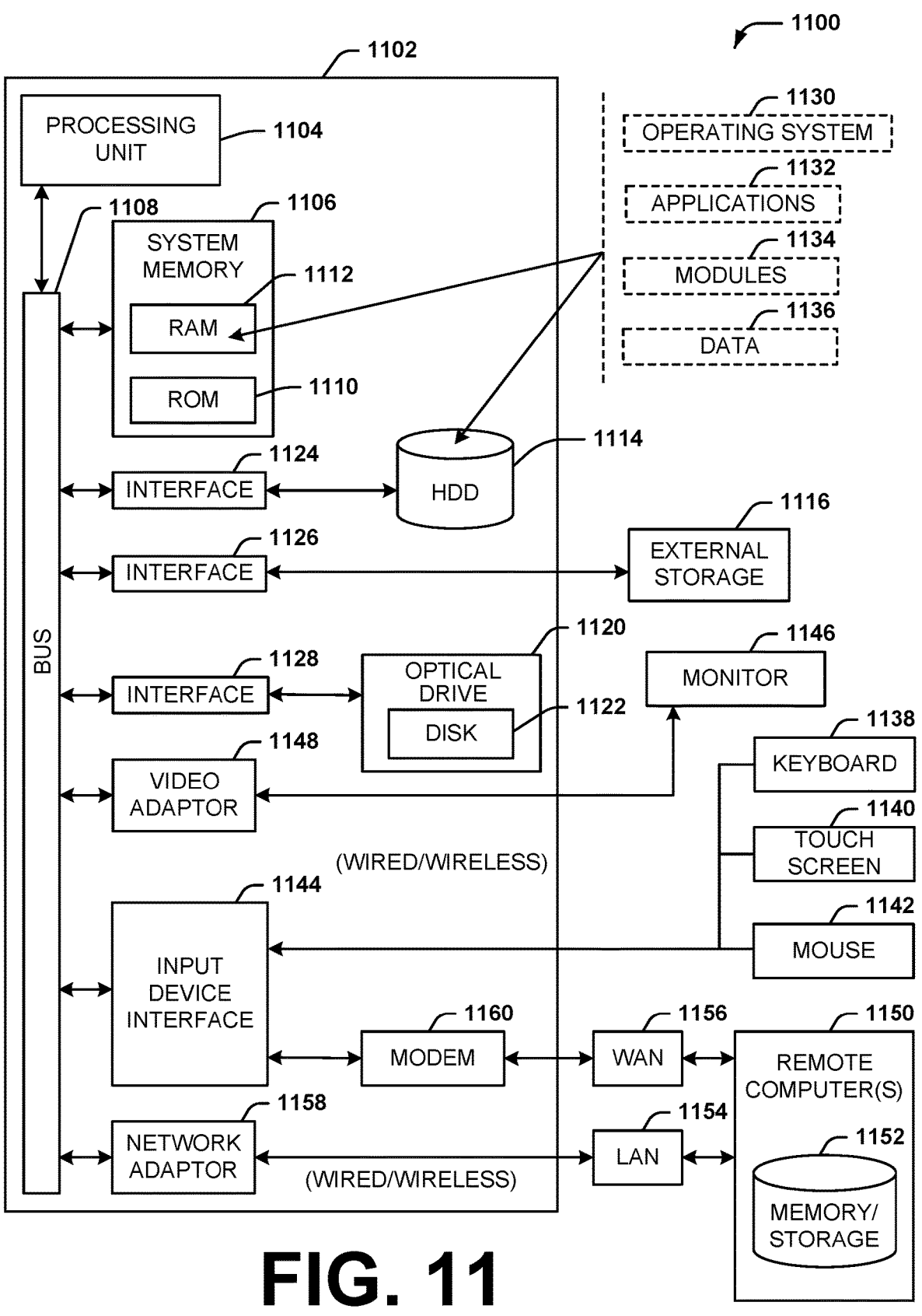
FIG. 11 illustrates an example computer environment.

In order to provide additional context for various embodiments described herein, FIG. 11 and the following discussion are intended to provide a brief, general description of a suitable computing environment 1100 in which various embodiments of the embodiment described herein can be implemented. While embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors and may include a cache memory. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

Computer 1102 further includes an internal hard disk drive (HDD) 1114 (e.g., EIDE, SATA), one or more external storage devices 1116 (e.g., a magnetic floppy disk drive (FDD), a memory stick or flash drive reader, a memory card reader, etc.) and an optical disk drive 1120 (e.g., which can read or write from disk 1122, for example a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid-state drive (SSD) could be used in addition to, or in place of, an HDD 1114. The HDD 1114, external storage device(s) 1111 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can comprise a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are examples and other means of establishing a communications link between the computers can be used.

When used in either a LAN or WAN networking environment, the computer 1102 can access cloud storage systems or other network-based storage systems in addition to, or in place of, external storage devices 1111 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 12:
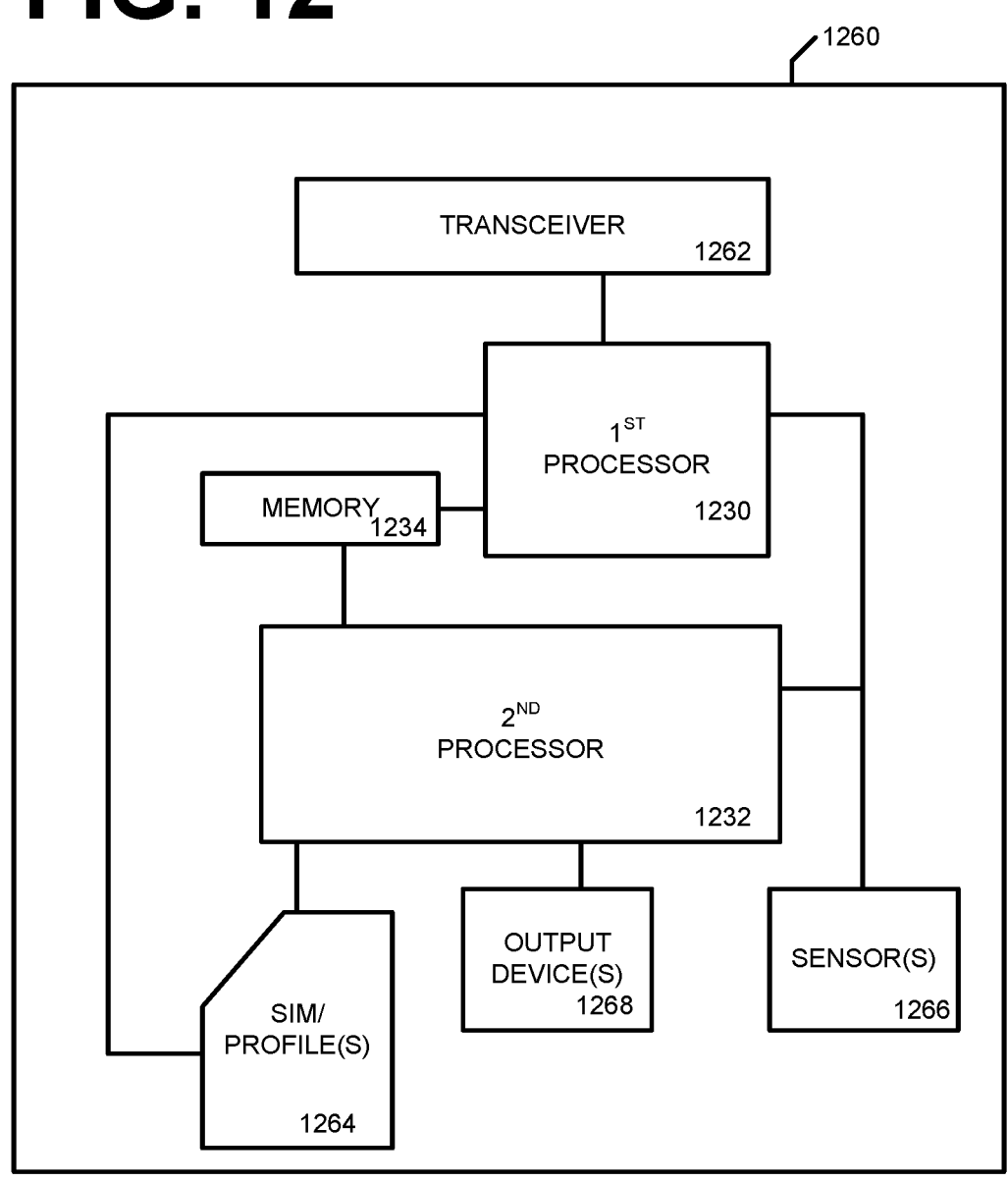
FIG. 12 illustrates a block diagram of an example wireless user equipment.

Turning now to FIG. 12, the figure illustrates a block diagram of an example UE 1260. UE 1260 may comprise a smart phone, a wireless tablet, a laptop computer with wireless capability, a wearable device, a machine device that may facilitate vehicle telematics, an intermediate XR processing unit, and the like. UE 1260 may comprise a first processor 1230, a second processor 1232, and a shared memory 1234. UE 1260 may include radio front end circuitry 1262, which may be referred to herein as a transceiver, but is understood to typically include transceiver circuitry, separate filters, and separate antennas for facilitating transmission and receiving of signals over a wireless link, such as one or more wireless links 125, 135, or 137 shown in FIG. 1. Furthermore, transceiver 1262 may comprise multiple sets of circuitry or may be tunable to accommodate different frequency ranges, different modulations schemes, or different communication protocols, to facilitate long-range wireless links such as links 125, device-to-device links, such as links 135, and short-range wireless links, such as links 137.

Continuing with description of FIG. 12, UE 1260 may also include a SIM 1264, or a SIM profile, which may comprise information stored in a memory (memory 1234 or a separate memory portion), for facilitating wireless communication with RAN 105 or core network 130 shown in FIG. 1. FIG. 12 shows SIM 1264 as a single component in the shape of a conventional SIM card, but it will be appreciated that SIM 1264 may represent multiple SIM cards, multiple SIM profiles, or multiple eSIMs, some or all of which may be implemented in hardware or software. It will be appreciated that a SIM profile may comprise information such as security credentials (e.g., encryption keys, values that may be used to generate encryption keys, or shared values that are shared between SIM 1264 and another device, which may be a component of RAN 105 or core network 130 shown in FIG. 1). A SIM profile 1264 may also comprise identifying information that is unique to the SIM, or SIM profile, such as, for example, an International Mobile Subscriber Identity ("IMSI") or information that may make up an IMSI.

SIM 1264 is shown coupled to both first processor portion 1230 and second processor portion 1232. Such an implementation may provide an advantage that first processor portion 1230 may not need to request or receive information or data from SIM 1264 that second processor 1232 may request, thus eliminating the use of the first processor acting as a 'go-between' when the second processor uses information from the SIM in performing its functions and in executing applications. First processor 1230, which may be a modem processor or baseband processor, is shown smaller than processor second 1232, which may be a more sophisticated application processor than the first processor, to visually indicate the relative levels of sophistication (i.e., processing capability and performance) and corresponding relative levels of operating power consumption levels between the two processor portions. Keeping the second processor portion 1232 asleep/inactive/in a low power state when UE 1260 does not need the second processor for executing applications and processing data related to an application provides an advantage of reducing power consumption when the UE only needs to use the first processor portion 1230 while in listening mode for monitoring routine configured bearer management and mobility management/maintenance procedures, or for monitoring search spaces that the UE has been configured to monitor while the second processor portion remains inactive/asleep.

UE 1260 may also include sensors 1266, such as, for example, temperature sensors, accelerometers, gyroscopes, barometers, moisture sensors, light sensors, and the like that may provide signals to the first processor 1230 or second processor 1232. Output devices 1268 may comprise, for example, one or more visual displays (e.g., computer monitors, VR appliances, and the like), acoustic transducers, such as speakers or microphones, vibration components, and the like. Output devices 1268 may comprise software that interfaces with output devices, for example, visual displays, speakers, microphones, touch sensation devices, smell or taste devices, and the like, that are external to UE 1260.

The following glossary of terms given in Table 1 may apply to one or more descriptions of embodiments disclosed herein.

TABLE 1

| Term | Definition |
| --- | --- |
| UE | User equipment |
| WTRU | Wireless transmit receive unit |
| RAN | Radio access network |
| QoS | Quality of service |
| DRX | Discontinuous reception |
| EPI | Early paging indication |
| DCI | Downlink control information |
| SSB | Synchronization signal block |
| RS | Reference signal |
| PDCCH | Physical downlink control channel |
| PDSCH | Physical downlink shared channel |
| MUSIM | Multi-SIM UE |
| SIB | System information block |
| MIB | Master information block |
| eMBB | Enhanced mobile broadband |
| URLLC | Ultra reliable and low latency communications |
| mMTC | Massive machine type communications |
| XR | Anything-reality |
| VR | Virtual reality |
| AR | Augmented reality |
| MR | Mixed reality |
| DCI | Downlink control information |
| DMRS | Demodulation reference signals |
| QPSK | Quadrature Phase Shift Keying |
| WUS | Wake up signal |
| HARQ | Hybrid automatic repeat request |
| RRC | Radio resource control |
| C-RNTI | Connected mode radio network temporary identifier |
| CRC | Cyclic redundancy check |
| MIMO | Multi input multi output |
| UE | User equipment |
| CBR | Channel busy ratio |
| SCI | Sidelink control information |
| SBFD | Sub-band full duplex |
| CLI | Cross link interference |
| TDD | Time division duplexing |
| FDD | Frequency division duplexing |
| BS | Base-station |
| RS | Reference signal |
| CSI-RS | Channel state information reference signal |
| PTRS | Phase tracking reference signal |
| DMRS | Demodulation reference signal |
| gNB | General NodeB |
| PUCCH | Physical uplink control channel |
| PUSCH | Physical uplink shared channel |
| SRS | Sounding reference signal |
| NES | Network energy saving |
| QCI | Quality class indication |
| RSRP | Reference signal received power |
| PCI | Primary cell ID |
| BWP | Bandwidth Part |

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" or variations thereof as may be used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:
1. A method, comprising:
facilitating, by a radio network node comprising at least one processor, receiving, from a first network compo-
nent, a beam pattern configuration comprising beam pattern information corresponding to at least one beam pattern;
facilitating, by the radio network node, receiving, from a second network component, a progressive paging configuration comprising at least one subpattern indication indicative of at least one of the at least one beam pattern;
facilitating, by the radio network node, receiving, from a third network component, a paging request directed to a user equipment;
responsive to the paging request, facilitating, by the radio network node, transmitting a paging message to the user equipment according to the at least one of the at least one beam pattern indicated by the at least one subpattern indication;
facilitating, by the radio network node, forming a first formed beam, wherein a first pattern of the at least one beam pattern comprises the first formed beam; and
facilitating, by the radio network node, forming a second formed beam, wherein a second pattern of the at least one beam pattern comprises the second formed beam, wherein the first formed beam is different than the second formed beam, wherein the first formed beam and the second formed beam are different than at least one baseline beam that corresponds to at least one baseline beam gain and at least one baseline beam width, wherein the first formed beam corresponds to a first beam gain that is less that the at least one baseline beam gain and a first beam width that is greater than the at least one baseline beam width, and wherein the second formed beam corresponds to a second beam gain that is less that the first beam gain and a second beam width that is greater than the first beam width.

2. The method of claim 1, wherein the radio network node is configured with a baseline beam configuration comprising baseline beam information corresponding to at least one baseline beam pattern comprising the at least one baseline beam, and wherein the at least one baseline beam pattern is different than the at least one of the at least one beam pattern indicated by the at least one subpattern indication.

3. The method of claim 1, wherein the facilitating of the transmitting of the paging message further comprises:
facilitating forming of at least one formed beam corresponding to the at least one of the at least one beam pattern indicated by the at least one subpattern indication based on a function of at least one baseline beam corresponding to a baseline beam pattern.

4. The method of claim 3, wherein the at least one formed beam is determined based on a beam function applied to the at least one baseline beam.

5. The method of claim 4, wherein the beam function comprises a mathematical function.

6. The method of claim 5, wherein the mathematical function comprises an average of at least two beam vectors corresponding to at least two of the at least one baseline beam.

7. The method of claim 1, wherein the progressive paging configuration comprises at least one wait period associated with the at least one subpattern indication, the method further comprising:
facilitating, by the radio network node, waiting a wait period of the at least one wait period after a first transmitting of the paging message to the user equipment according to the first pattern; and
responsive to failing, by the radio network node, to receive a paging response from the user equipment by an occurrence of an end of the wait period, facilitating, by the radio network node, a second transmitting of the paging message to the user equipment according to the second pattern.

8. The method of claim 1, wherein the progressive paging configuration comprises at least one wait period associated with the at least one of the at least one subpattern indication, the method further comprising:

facilitating, by the radio network node, waiting a wait period of the at least one wait period after a first transmitting of the paging message to the user equipment according to a pattern of the at least one of the at least one beam pattern indicated by a subpattern indication of the at least one subpattern indication;

facilitating, by the radio network node, receiving, from the user equipment, a paging response by an occurrence of an end of the wait period; and facilitating, by the radio network node, establishing a communication session with the user equipment.

9. The method of claim 1, further comprising:

facilitating, by the radio network node, transmitting, to the user equipment, the progressive paging configuration, usable by the user equipment to determine monitoring of the at least one of the at least one beam pattern.

10. The method of claim 1, wherein the radio network node is a radio access network node of a long-range wireless radio access network.

11. The method of claim 10, wherein at least one of the first network component, second network component, or third network component is part of a core network corresponding to the long-range wireless radio access network.

12. The method of claim 1, wherein the radio network node comprises a satellite.

13. A radio node, comprising:

at least one processor configured to process executable instructions that, when executed by the at least one processor, facilitate performance of operations, comprising:

receiving a beam pattern configuration comprising beam pattern information corresponding to at least one beam pattern, wherein the beam pattern configuration is transmitted via a core network;

receiving a progressive paging configuration comprising at least one subpattern indication indicative of at least one of the at least one beam pattern, wherein the progressive paging configuration is transmitted via the core network;

receiving a paging request directed to at least one user equipment, wherein the paging request is transmitted via the core network;

responsive to the paging request, transmitting a paging message directed to the at least one user equipment according to the at least one of the at least one beam pattern indicated by the at least one subpattern indication;

forming a first formed beam, wherein a first pattern of the at least one beam pattern comprises the first formed beam; and forming a second formed beam, wherein a second pattern of the at least one beam pattern comprises the second formed beam, wherein the first formed beam is different than the second formed beam, wherein the first formed beam and the second formed beam are different than a baseline beam that corresponds to a baseline beam gain and a baseline beam width, wherein the first formed beam corresponds to a first beam gain that is less that the baseline beam gain and a first beam width that is greater than the baseline beam width, and wherein the second formed beam corresponds to a second beam gain that is less that the first beam gain and a second beam width that is greater than the first beam width.

14. The radio node of claim 13, wherein the progressive paging configuration comprises at least one wait period associated with the at least one of the at least one subpattern indication, and wherein the operations further comprise:

waiting a first wait period of the at least one wait period after a first transmitting of the paging message to the at least one user equipment according to the first pattern of the at least one of the at least one beam pattern indicated by a first subpattern indication of the at least one subpattern indication; and based on failing to receive a paging response from the at least one user equipment as late as an occurrence of an end of the first wait period, transmitting the paging message to the at least one user equipment according to the second pattern of the at least one of the at least one beam pattern indicated by a second subpattern indication of the at least one subpattern indication.

15. The radio node of claim 14, wherein the first wait period is associated in the progressive paging configuration with the first subpattern indication of the at least one subpattern indication, wherein a second wait period is associated with the second subpattern indication of the at least one subpattern indication in the progressive paging configuration, and wherein the operations further comprise:

waiting the second wait period after transmitting the paging message according to the second pattern of the at least one of the at least one beam pattern; and based on failing to receive a paging response from the at least one user equipment as late as an occurrence of an end of the second wait period, transmitting the paging message to the at least one user equipment according to a third pattern of the at least one of the at least one beam pattern indicated by a third subpattern indication of the at least one subpattern indication.

16. The radio node of claim 15, wherein the first wait period and the second wait period are different.

17. The radio node of claim 13, wherein the operations further comprise:

forming at least one formed beam corresponding to the at least one of the at least one beam pattern indicated by the at least one subpattern indication, and wherein the at least one formed beam is determined based on a beam function applied to an at least one baseline beam.

18. A non-transitory machine-readable medium, comprising executable instructions that, when executed by at least one processor of a radio network node, facilitate performance of operations, comprising:

receiving a progressive paging configuration, comprising at least one subpattern indication indicative of at least one beam pattern, wherein the progressive paging configuration is transmitted via a core network;

receiving a paging request directed to at least one user equipment via the core network;

responsive to the paging request, transmitting a paging message directed to the at least one user equipment according to the at least one beam pattern indicated by the at least one subpattern indication;

forming a first formed beam, wherein a first pattern of the at least one beam pattern comprises the first formed beam; and forming a second formed beam, wherein a second pattern of the at least one beam pattern comprises the second formed beam, wherein the first formed beam is different than the second formed beam, wherein the first formed beam and the second formed beam are different than a baseline beam that corresponds to a baseline beam gain and a baseline beam width, wherein the first formed beam corresponds to a first beam gain that is less that the baseline beam gain and a first beam width that is greater than the baseline beam width, and wherein the second formed beam corresponds to a second beam gain that is less that the first beam gain and a second beam width that is greater than the first beam width.

19. The non-transitory machine-readable medium of claim 18, wherein the at least one beam pattern indicated by the at least one subpattern indication comprises fewer beams than the baseline beam pattern.

20. The non-transitory machine-readable medium of claim 18, wherein the radio network node corresponds to a satellite.

* * * * *